(12) United States Patent
Hanson et al.

(10) Patent No.: US 6,547,229 B1
(45) Date of Patent: Apr. 15, 2003

(54) STACKING APPARATUS AND METHOD FOR LAMINATED PRODUCTS AND PACKAGING

(75) Inventors: Eric J. Hanson, Hudson, WI (US); John R. Wheeler, Oakdale, MN (US); Alan P. Miller, Woodbury, MN (US); David B. Pritchard, Bloomington, MN (US); Donald G. Peterson, Shoreview, MN (US); John R. Jacobson, Newport, MN (US); Jeffrey J. Missling, Mound, MN (US); James N. Dobbs, Woodbury, MN (US); David C. Kramlich, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 122 days.

(21) Appl. No.: 09/718,549

(22) Filed: Nov. 22, 2000

(51) Int. Cl.[7] ............................................... B32B 31/16
(52) U.S. Cl. ...................... 270/52.09; 221/73; 156/230; 156/361; 156/540; 156/541; 156/584; 156/542
(58) Field of Search ...................... 270/52.09; 156/230, 156/238, 361, 540, 541, 584, 542; 221/73

(56) References Cited

U.S. PATENT DOCUMENTS

| | | |
|---|---|---|
| 4,118,024 A | 10/1978 | Gerhardt |
| 4,190,241 A | 2/1980 | Krueger |
| 4,286,486 A | 9/1981 | Franks |
| 4,753,703 A | 6/1988 | Jensen |
| 4,841,712 A * | 6/1989 | Roou ........................ 53/412 |
| 4,897,917 A | 2/1990 | Gauthier et al. |
| 5,009,744 A * | 4/1991 | Mandai et al. ................ 216/6 |
| 5,019,469 A | 5/1991 | Muller |
| 5,100,746 A | 3/1992 | Muller et al. |
| 5,104,116 A | 4/1992 | Pohjola |
| 5,209,810 A | 5/1993 | Marschke |
| 5,360,684 A | 11/1994 | Duval et al. |
| 5,364,485 A | 11/1994 | Miura |
| 5,480,087 A | 1/1996 | Young et al. |

(List continued on next page.)

FOREIGN PATENT DOCUMENTS

| | | |
|---|---|---|
| EP | 690 520 | 1/1996 |
| JP | SHO 58-218753 | 12/1983 |
| JP | SHO 63-307670 | 12/1988 |
| JP | HEI 3-152881 | 6/1991 |

(List continued on next page.)

*Primary Examiner*—Patrick H. Mackey
(74) *Attorney, Agent, or Firm*—Mark A. Hollingsworth

(57) ABSTRACT

A product stacking apparatus and method employs one or more stations, each including a stationary stacking platform or a conveyor upon which spaced-apart pucks are coupled for travel thereon. A product delivery apparatus drives one or more movable webs to which segmented product sheets are removably affixed. The product delivery apparatus includes one or more rotatable lamination interfaces associated with each of the stations for transferring product sheets from the webs to the pucks on a repetitive basis to produce a stack of product sheets on the respective pucks. Each of the segmented product sheets may define all or a portion of an electrochemical cell, all or a portion of a pad including layers of film or sheet material, wherein a portion of each of the layers is provided with a bonding feature, or all or a portion of a pack comprising layers of medical dressing. A puck need not be in motion during the transfer of the product sheet from the lamination roll to the puck. The puck may or may not be attached to a conveyor, but the conveyor need not be in motion during the lamination or stack building process. In this case, a roller is moved across the puck and simultaneously rotated so a point on the surface of the roller interfaces with the puck at the same location on each pass.

74 Claims, 18 Drawing Sheets

U.S. PATENT DOCUMENTS

| | | | |
|---|---|---|---|
| 5,514,232 A | | 5/1996 | Burns |
| 5,536,278 A | | 7/1996 | St.-Amant et al. |
| 5,584,954 A | | 12/1996 | Van der Klugt |
| 5,740,661 A | * | 4/1998 | Yamaguchi et al. .......... 53/553 |
| 5,772,838 A | | 6/1998 | Zablotny et al. |
| 5,788,802 A | | 8/1998 | Raney |
| 5,879,489 A | | 3/1999 | Burns et al. |
| 5,922,168 A | * | 7/1999 | Zablotny et al. ............ 156/379 |
| 5,938,890 A | * | 8/1999 | Schlinkmann et al. ...... 156/541 |
| 6,139,004 A | * | 10/2000 | Couillard et al. ............. 271/70 |
| 6,211,991 B1 | * | 4/2001 | Bryan ........................ 359/254 |
| 6,227,541 B1 | * | 5/2001 | Couillard et al. ........... 271/307 |
| 6,379,098 B1 | * | 4/2002 | Shibasaki ................... 156/584 |

FOREIGN PATENT DOCUMENTS

| | | |
|---|---|---|
| JP | HEI 4-67577 | 4/1992 |
| JP | 98199545 | 7/1998 |
| JP | 94188030 | 7/1999 |
| WO | WO 97/31400 | 8/1997 |

* cited by examiner

STACKING APPARATUS AND METHOD FOR LAMINATED PRODUCTS AND PACKAGING

FIELD OF THE INVENTION

This invention relates generally to lamination apparatuses and methods and, more particularly, to stacking lamination apparatuses and methods.

BACKGROUND OF THE INVENTION

Various lamination apparatuses and processes have been developed to produce products constructed from sheet material. Many conventional lamination approaches employ a cutting mechanism that cuts a sheet of material into small segments. The individual segments are then manually or mechanistically aligned and layered as part of a separate lamination process. The layered structure is then subjected to lamination forces by an appropriate force producing mechanism.

Notwithstanding the variety of conventional lamination and stacking approaches currently available, many of such approaches are not well suited for applications which require relatively high levels of productivity, automation, and flexibility. For example, many conventional lamination processes are unable to accommodate varying types of materials, sheet sizes, and sheet shapes. Many of such available lamination techniques are not well suited nor adaptable to autonomously and continuously laminate multiple webs of differing materials, as is typically necessary in the construction of thin-film electrochemical laminate structures, for example.

There exists a need for an improved apparatus and method for laminating and stacking films and sheet materials of varying types, colors, shapes, and sizes. There exists a particular need for an improved apparatus and method for laminating layers of electrochemical cell materials and for producing stacks of electrochemical cell materials for use in the construction of solid-state, thin-film batteries. The present invention fulfills these and other needs.

SUMMARY OF THE INVENTION

The present invention is directed to a product stacking apparatus and method. According to an embodiment of a product stacking apparatus, one or more stations are provided, each including a conveyor upon which spaced-apart pucks are coupled for travel thereon. A product delivery apparatus drives one or more movable webs to which segmented product sheets are removably affixed. The product delivery apparatus includes one or more rotatable lamination interfaces associated with each of the stations for transferring product sheets from the webs to the pucks on a repetitive basis to produce a stack of product sheets on the respective pucks.

The movable webs may each incorporate a release liner to which the segmented product sheets are removably affixed. The product delivery apparatus may include a feed apparatus and a wind apparatus associated with each of the webs. The product sheets travel through a nip respectively formed between one or more of the rotatable lamination interfaces and the respective pucks.

The product delivery apparatus may include a position adjustment mechanism coupled to the one or more rotatable lamination interfaces and a sensor that senses a change in height of the stack of product sheets developed on the pucks. The position adjustment mechanism adjusts a position of the rotatable lamination interfaces in response to the sensor sensing a change in height of the stack of product sheets.

The pucks may be coupled to the one or more conveyors for continuous loop travel thereupon. Alternatively, the pucks may be coupled to the one or more conveyors for reciprocating travel thereupon. A control system may include sensors that sense a parameter of puck movement. The control system adjusts one or both of conveyor movement and/or web movement to maintain a desired registration of the product sheets on the pucks in response to the sensed puck movement parameter. The control system may further include sensors that sense a parameter of web movement. In this case, the control system adjusts one or both of conveyor movement and/or web movement to maintain a desired registration of the product sheets on the pucks in response to the sensed web movement parameter.

Each of the segmented product sheets may define all or a portion of an electrochemical cell, including cells used in solid-state thin-film batteries and fuel cells, for example. In another embodiment, each of the segmented product sheets may define all or a portion of a pad comprising layers of film or sheet material, wherein a portion of each of the layers is provided with an adhesive. In a further embodiment, each of the segmented product sheets defines all or a portion of a pack comprising layers of medical dressing.

According to another embodiment of product stacking apparatus, a first station includes a first conveyor upon which spaced-apart first pucks are coupled for travel thereon. A second station includes a second conveyor upon which spaced-apart second pucks are coupled for travel thereon. A product delivery apparatus drives a movable web to which segmented product sheets are removably affixed. The product delivery apparatus transfers alternating product sheets to the respective first and second pucks of the first and second stations on a repetitive basis so as to produce a stack of product sheets on the respective first and second pucks.

The product delivery apparatus, according to this embodiment, includes a feed apparatus, a wind apparatus, a first application roller, and a second application roller. The alternating product sheets travels through nips respectively formed between the first and second application rollers and the first and second pucks in response to feed and wind apparatus movement of the web. The product delivery apparatus may include position adjustment mechanisms coupled to the first and second application rollers and a sensor that senses a change in height of the stack of product sheets. The position adjustment mechanism adjusts a position of the first and second application rollers in response to the sensor sensing a change in height of the stack of product sheets.

A control system may include sensors that sense a parameter of first and second puck movement, respectively. The control system adjusts first and second conveyor movement and/or web movement to maintain a desired registration of the product sheets on the respective first and second pucks.

In accordance with yet another embodiment of a product stacking apparatus, a station includes a conveyor upon which spaced-apart pucks are coupled for travel thereon. A first product delivery apparatus drives a movable first web to which segmented first product sheets are removably affixed. The first product delivery apparatus transfers first product sheets to each of the pucks. The product stacking apparatus, according to this embodiment, includes a second product delivery apparatus that drives a movable second web to which segmented second product sheets are removably affixed. The second product delivery apparatus transfers second product sheets to each of the pucks. The first and second product delivery apparatuses transfer respective first and second sheets to each of the pucks on a repetitive basis to produce a stack of alternating first and second product sheets on each of the pucks.

Each of the first and second product delivery apparatuses includes a feed apparatus, a wind apparatus and an application roller. The first and second product sheets travel through nips respectively formed between their respective application rollers and the pucks in response to feed and wind apparatus movement of the first and second webs.

Each of the first and second product delivery apparatuses may further include position adjustment mechanisms coupled to their respective first and second application rollers and a sensor that senses a change in height of the stack of product sheets. The position adjustment mechanism adjusts a position of the respective first and second application rollers in response to the sensor sensing a change in height of the stack of product sheets. First and second roller position adjustment can also be accomplished via pressure sensing and pressure control of the rolls on the pucks.

A control system including sensors that sense a parameter of puck and/or web movement and adjusts conveyor and/or web movement to maintain a desired registration of the product sheets on the pucks. The control system may independently adjust first and second product delivery apparatus movement to maintain the desired registration of the product sheets on the pucks.

According to a further embodiment, a method of stacking sheets of material on a number of pucks involves moving the spaced-apart pucks on a recirculating path. The method further includes moving one or more webs, wherein each web includes a release liner to which segmented product sheets are removably affixed. One or more of the webs are moved into proximity with the pucks on a successive basis.

The method also includes forming a nip between one or more of the moving webs and the pucks, and rotatably transferring product sheets from one or more of the webs to the pucks at the nip on a repetitive basis to produce a stack of product sheets on the respective pucks.

According to another embodiment, a method of stacking sheets of material involves moving a number of spaced-apart pucks on a recirculating path and moving a web having a release liner to which segmented product sheets are removably affixed. The method further involves transferring, using a vacuum lamination roll, the segmented product sheets from the release liner into a nip defined between the vacuum lamination roll and the pucks. Product sheets are transferred from the vacuum lamination roll to the pucks at the nip on a repetitive basis to produce a stack of product sheets on the respective pucks.

The stacking method may further include sensing a height of the stack of product sheets on the pucks and adjusting a position of the nip as a function of the height of the stack of product sheets on the pucks. Moving the pucks may involve moving the pucks for continuous loop travel or reciprocating travel along the recirculating path. A parameter of web movement and/or puck movement may be sensed and one or both of puck movement and/or web movement may be adjusted to maintain a desired registration of the product sheets on the pucks.

According to another embodiment, a puck need not be in motion during the transfer of the product sheet from the lamination roll to the puck. The puck may or may not be attached to a conveyor, but in this embodiment the conveyor need not be in motion during the lamination or stack building process. A roller is moved across the puck and simultaneously rotated so a point on the surface of the roller interfaces with the puck at the same location on each pass. The roll is capable of holding the segmented product sheet in a fixed position on the surface of the roll, such as by vacuum, electrostatics, or with an adhesive.

According to this embodiment, an adjustable mechanism is provided to control the distance from the surface of the puck to the surface of the lamination roll. As the stack height grows the distance is increased. The roll may deliver a segmented product sheet or a segmented product sheet supported by a liner sheet to the puck. Two dissimilar laminates or laminate composites may be laminated into a single stack with precision alignment. Pallets of each laminate can be utilized for laminate pick up prior to lamination.

In accordance with yet another embodiment, a product stacking apparatus includes a station comprising an adjustable table. A puck is coupled to the adjustable table top surface. A rotatable lamination surface is provided, and a position adjustment apparatus adjusts the relative position between the puck and the lamination surface. One or more product delivery apparatuses deliver one or more product layered structures to the lamination surface. The lamination surface rotatably transfers the product layered structures to the puck on a repetitive and alternating basis to produce a stack of alternating product layered structures on the puck.

According to a further embodiment, a first product delivery apparatus feeds first product layered structures to the lamination surface. A second product delivery apparatus feeds second product layered structures to the lamination surface. The lamination surface transfers respective first and second layered structures to the puck on a repetitive and alternating basis to produce a stack of alternating first and second product layered structures on the puck.

The rotatable lamination surface may include a vacuum system, an adhesive, or electrostatics to releasably hold the product layered structures to the rotatable lamination surface. The rotatable lamination surface and the adjustable table top surface may be manually adjustable. Alternatively, the rotatable lamination surface and the adjustable table top surface may be fully or partially automatically adjustable. In one embodiment, the position adjustment apparatus includes a rack and pinion apparatus.

All or a portion of the puck may comprise a thermal and electrical insulating material. The puck may include multiple-axis position indicators, such as x, y, and z axis position indicators. The puck may further include a yaw indicator.

The first and second product respectively include a web of single or multiple layered structures. The layered structures may comprise release liners. The first and second product delivery apparatuses may respectively comprise a manual sheet feed apparatus or, alternatively, a partially or fully automatic sheet feed apparatus.

In accordance with another embodiment, an input to a stacking apparatus of the present invention may be coupled to an output of a rotary converting apparatus according to the present invention. A combined rotary converting/stacking apparatus and methodology according to the present invention provides for the production of laminated stacks of similar or dissimilar layers of varying materials, in virtually any shape.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
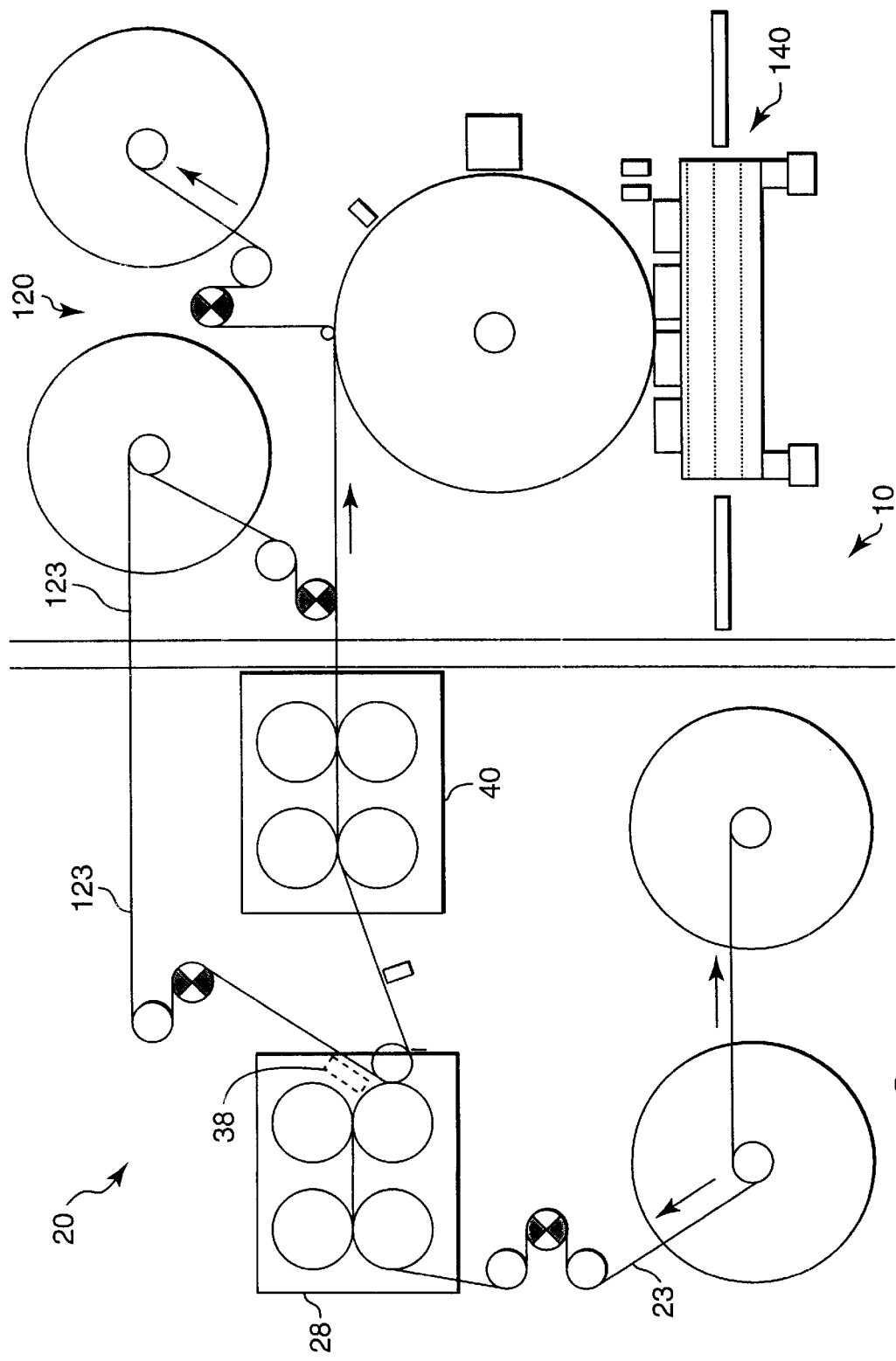
FIG. 1 illustrates a rotary converting and stacking apparatus in accordance with an embodiment of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Rotary converting lamination and stacking apparatuses of the present invention advantageously provide for the production of laminated stacks of similar or dissimilar layers of varying materials, in virtually any shape. The principles of the present invention may be applied to product laminate stacks of product from a single product web or from multiple product webs (e.g., five different product webs). The laminate stacks of product produced in accordance with the present invention may include pads of single or multi-colored sheets or films, packs of medical dressings, and thin-film batteries, for example.

One particular application concerns the production of electrochemical battery cells, in which multiple alternating layers of cathode, separator, and anode material are cut and laminated into a stack or unit cell. A thin-film electrochemical unit cell producible within the context of the present invention may be defined as a stack subassembly comprising a minimum of the following sheets: current collector, cathode, separator, and anode, typically in this order. By providing two or more rotary converting stations upstream of a stacking apparatus, for example, the cathode and anode layers may be cut independently, which is important in preventing shorts between unit cell anode and cathode structures.

Depending on the relative placement of the separator, and the choices in tooling and timing, the respective areas of cathode, anode, and separator can be determined independently. This is important in maintaining uniform current distribution, which is critical to electrochemical cell life. For example, by sizing the separator larger than the cut cathode, macroscopic shorts caused by edge burrs are prevented. This may advantageously provide for the elimination of secondary insulators that may otherwise be required between the electrodes in some cell designs.

These principles may also apply to fuel cell constructions. Further, these principles may be used to produce new packaged medical products, in which only one layer of packaging is used per layer of product, and the final product is delivered to the customer in converted, stacked, and packaged form. The first and last layers placed on the stack may, for example, be the outer packaging.

Referring now to the Figures, there is shown in FIG. 1 an apparatus 10 that produces a series of electrochemical cell sheets using webs of cathode and anode material, and for producing a stack of electrochemical cell layers. The apparatus 10 depicts two processing apparatuses 20 and 120, referred to herein as a rotary converting apparatus 20 and a stacking apparatus 120, respectively. The apparatus 10 provides for a continuous motion assembly process that, in one embodiment, produces flat, relatively inflexible multilayer stacks of electrochemical cell material layers—which may or may not include layers of low ductility—from relatively flexible material supported by a releasable liner. An advantage of the present invention is the ability to stack multilayer assemblies containing zero or more layers of low ductility material. In this regard, a stacking process of the present invention accommodates the elongation properties of the layers in the product, which may vary dramatically from product to product.

It will be appreciated that the rotary converting and stacking apparatuses 20, 120 individually incorporate a number of unique and useful features, and as such, these apparatuses and associated processing methodologies may be exploited on an individual basis and need not be combined as part of a comprehensive two-part apparatus as is depicted in FIG. 1. As will be discussed hereinbelow, the rotary converting apparatus 20, which can be implemented in a variety of ways, may be separately employed to produce a series of laminated unit cell structures, typically supported by a release liner. Exemplary rotary converting apparatuses and methods are disclosed in commonly assigned, co-pending application U.S. Ser. No. 09/718,854 entitled "Rotary Converting Apparatus and Method for Laminated Products and Packaging," which is hereby incorporated by reference herein in its entirety. The stacking apparatus 120, which may be implemented in a variety of ways, may be separately employed to produce stacks of electrochemical cell layers using a continuous motion stacking operation.

The rotary converting apparatus 20, in general terms, converts a cathode web 23 and an anode web 123 into a series of layered electrochemical cell structures supported by a release liner. The stacking apparatus 120 provides for the continuous stacking of electrochemical cell structures transferred from the release liner to a number of recirculating, looping or reciprocating platforms, referred to herein interchangeably as pucks, pallets or carriages. One advantage realized through employment of a rotary converting process of the present invention involves the creation of a product having a finished size, without need for downstream or subsequent cutting.

In one embodiment, the layered electrochemical cell structures include an anode layered structure, which generally incorporates one or more solid electrolyte layers, and a cathode layered structure. Such a structure is referred to herein as a unit cell, a configuration of which is described hereinabove.

A cathode layered structure may be defined as a subassembly comprising a cathode, current collector, and cathode. Another configuration of a cathode layered structure subassembly comprises a separator, cathode, current collector, and cathode. Yet another cathode layered structure subassembly configuration comprises a separator, cathode, current collector, cathode, and separator.

An anode layered structure may be defined as an individual anode sheet. An anode layered structure may also be defined as a subassembly comprising a separator and anode. Another configuration of an anode layered structure subassembly comprises a separator, anode, and separator.

By way of example, the cathode web 23 may be fabricated to include an aluminum foil current collector coated on both sides with a composite cathode material (cathode/current-collector/cathode structure). The anode web 123, for example, may be fabricated as a four-layer structure, which includes a release liner, a solid electrolyte film, lithium foil, and a second layer of solid electrolyte film (separator/anode/separator structure). In one particular embodiment, a solid polymer electrolyte film is employed in the anode web 123.

According to another embodiment, the cathode web 23 may include a separator, such as a solid polymer electrolyte film, on both sides of the composite cathode material. In yet another embodiment, a separator may be included on each of the cathode and anode webs 23, 123. Other multilayer cathode, anode, and solid electrolyte web structures are also contemplated.

In accordance with one implementation, the webs 23, 123 may be moved at speeds ranging between 0 and 10 meters/minute. The product web widths may be about 8 inches. The unit cell sheets may have a length of up to about 17 inches. The product web feed rolls may each have a diameter of up to about 18 inches.

Figure 2:
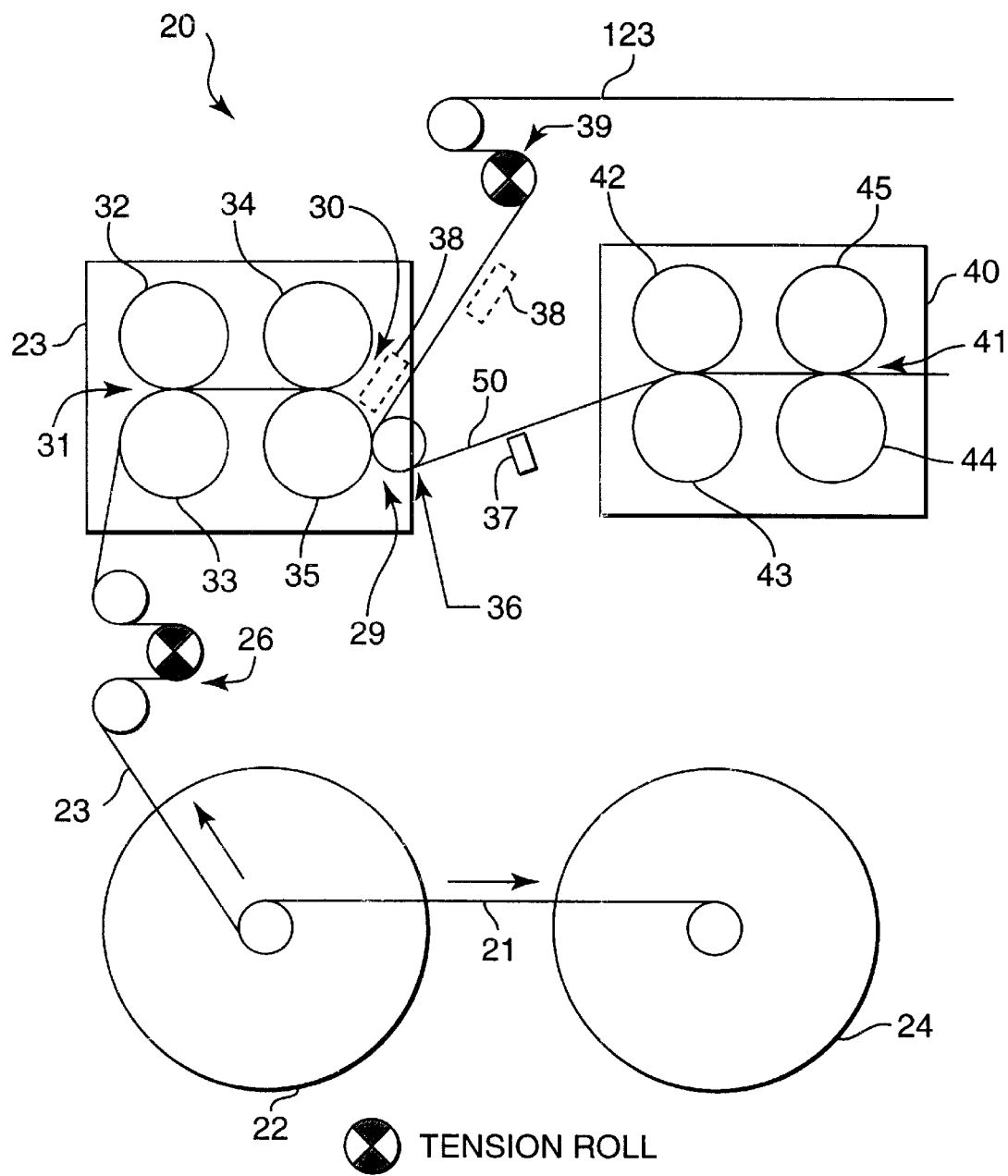
FIG. 2 is a sub-assembly of FIG. 1 that shows a rotary converting apparatus in accordance with an embodiment of the present invention.

Turning now to FIG. 2, there is shown in greater detail a rotary converting apparatus 20 in accordance with one embodiment of the present invention. The rotary converting apparatus 20 depicted in FIG. 2 includes a web 23 of cathode material initially wound on a cathode feed roll 22. As wound, the cathode web may include a release liner 21 which, during unwinding of the cathode feed roll 22, is wound onto a liner take-up roll 24. The cathode web 23, absent the release liner 21, is fed to a first cutting station 28. The cathode web 23 typically passes through a tension roll apparatus 26, which places the cathode web 23 into a desired state of tension and which may include a web guiding mechanism.

In the embodiment shown in FIG. 2, the first cutting station 28 represents a rotary die station. The first cutting station 28 includes a driven pull roll apparatus 31, which, in this case, includes a nip roll 32 and a rubber-covered drive roll 33. Alternatively, a vacuum pull roll apparatus may be used. The movement, such as speed and/or acceleration, of the pull roll apparatus 31 is typically regulated by a servo control system (not shown) as is known in the art. The pull roll apparatus 31 feeds the cathode web 23 to a cutting roll apparatus 30, which includes a rotary die 34 and an anvil 35. The cutting roll apparatus 30 cuts the cathode web 23 into individual cathode sheets. Movement, such as speed and/or acceleration, of the rotary die 34 and anvil 35 is typically regulated by a servo control system (not shown).

As is also shown in FIG. 2, a web of anode material 123 is fed to a lamination apparatus 29. The anode web 123 may also be heated by an infrared heater 38 (shown as infrared heater 38 in phantom) prior to entering or within the first cutting station 28. The anode web 123, as discussed previously, typically includes a release liner and may include two solid electrolyte layers, also referred to a separator layers, provided on opposing sides of an anode (e.g., lithium foil). The anode web 123 is typically placed into a desired degree of tension via a tension roll apparatus 39 and is typically guided.

The cathode sheets are rotated by the anvil 35 into proximity with the anode web 123 within the lamination apparatus 29. The cathode sheets are laminated to the anode web 123 at a nip formed between a lamination roll 36 and the anvil roll 35 to produce a laminated web 50 of unit cell material. The lamination roll 36 is typically covered with a rubber material and the anvil 35 is typically fabricated from a metal material.

According to one embodiment of the present invention, the anode web 123 is moved through the lamination apparatus 29 at a speed greater to that of the cathode web 23. This difference in relative speeds of the anode and cathode webs 123, 23 creates a space between the cathode sheets as each cathode sheet is laminated to the anode web 123. The laminated web 50 of unit cell material is fed from the first cutting station 28 to the second cutting station 40, where a cut is made through the anode web material, but not through the release liner.

At the second cutting station 40, a driven nip roll 42 and rubber-covered drive roll 43 feed the laminated web 50 into a cutting roll apparatus 41 which includes an anvil 45 and a rotary die 44. The rotary die 44, in cooperation with the anvil 45, cuts through the anode material, but not through the release liner, of the laminated web 50 within the space created between adjacent cathode sheets. The drive roll 42 may be heated. An optical sensor 37 is employed to detect the spaces between adjacent cathode sheets for purposes of ensuring that cuts in the laminated web 50 are made only within these spaces. It is noted that alignment of the space or gap between adjacent cathode sheets at the appropriate cutting location within the second cutting station 40 may be determined by use of proper timing, gearing, and/or belting, rather than by optical or other gap sensing or detecting.

A series of laminated unit cell sheets supported on a releasable liner is thus produced at an exit of the second cutting station 40. The laminated unit cell sheets may be wound on a take-up roll for later processing by a stacking apparatus or fed directly to a stacking apparatus as part of a continuous rotary converting/stacking operation, such as that shown in FIG. 1, for example.

An advantage realizable through implementing a rotary converting apparatus of the present invention concerns the ability to assemble electrochemical generators from discrete sheets of anode and cathode web material in which the anode sheet and cathode sheet are cut independently of one another, which advantageously prevents potential shorts from developing during the cutting processes. The spacing created between adjacent cathode sheets provides the ability to cut the cathode web 23 into cathode sheets independently from cutting of the anode web 123. More particularly, the cathode web 23 is cut at the first cutting station 28 into cathode sheets before being laminated to the over-sped anode web 123. The spaces previously created at the lamination apparatus 29 provide for cutting through of only the anode web material at the second cutting station 40.

Another advantage concerns the ability to independently cut cathode and anode sheets, as discussed above, and, in addition, laminate the cathode sheets with a crossweb offset relative to anode sheets, thereby creating a lamination offset therebetween. A unit cell sheet constructed in this manner may, for example, include a separator/anode/separator layered structure which extends beyond all four edges of a cathode coating. A current collector, which extend beyond one edge of the separator/anode/separator layered structure supports the cathode coating. It is noted that, according to this embodiment, both webs are multi-layered and all layers need not be the same width. This unit cell sheet structure provides several advantages, which include preventing shorts during a subsequent stacking and related cutting operation and cell assembly or finishing operations, and enhanced manufacturability.

Other unit cell sheet configurations are achievable by judicious sizing of the various material layers included within the respective cathode and anode webs 23,123. To continue, the anode web 123 which is fed into the lamination apparatus 29 may be constructed as a liner/separator/lithium foil/separator structure having a first edge, in which edges of the separator layers extend to the edge of the lithium foil, and a second edge, in which the lithium foil extends beyond the edges of the separator layers. Thus, a unit cell sheet structure may be developed such that the cathode and current collector layers are shorter in length than the anode layer.

Figure 3A:
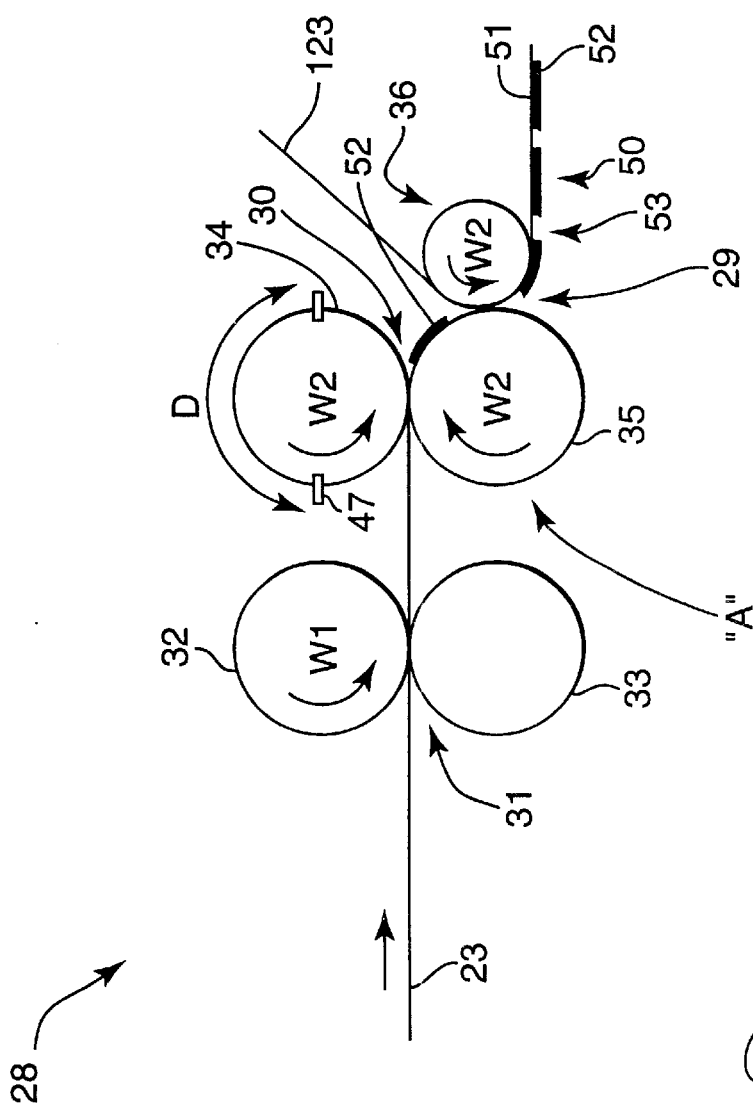
FIG. 3A is a sub-assembly of FIG. 2 that is a detailed depiction of a first rotating cutting/lamination interface of a rotary converting apparatus in accordance with an embodiment of the present invention.
Figure 3B:
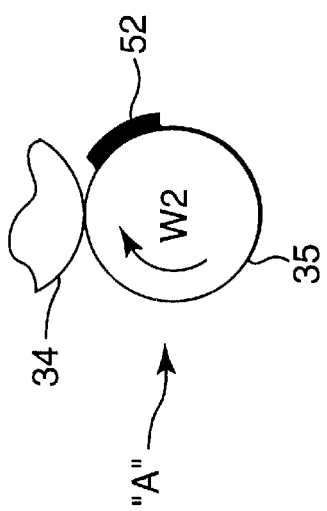
FIG. 3B shows a cut cathode sheet traveling on an anvil at the first rotating cutting/lamination interface shown in FIG. 3A.

FIGS. 3A and 3B illustrate in greater detail various aspects of the first cutting station 28 shown in FIGS. 1 and 2. In accordance with one embodiment, the cathode web 23 is moved by the pull roll apparatus 31 into the cutting roll apparatus 30 at a speed W1. The cutting roll apparatus 30, shown as including rotary die 34 and anvil 35, is controlled to move at a speed W2, which is greater than the speed W1 of the cathode web 23.

The die blades 47 provided on rotary die 34, in cooperation with the anvil 35, cut through the cathode web 23 to produce individual cathode sheets 52 (shown in greater detail in FIG. 3B). It is understood that rotary die 34 may include a single die blade 47, dual die blades 47, as is shown in FIGS. 3A, or greater than two die blades 47. Further, die blade 47 may be a single blade or a more complex blade arrangement. For example, a rectangular die blade arrangement or pattern may be provided on rotary die 34. It will be appreciated that other methods and apparatuses for cutting or stamping the cathode web 23 may be employed depending on a given system implementation, which may include the use of a shearing apparatus, laser, or water jet, for example.

In one embodiment, the anvil 35 is a vacuum anvil roll having a hole spacing pattern that is matched to the sheeting die blade spacing. The individual cathode sheets 52, transitioning from moving at speed W1 of the cathode web 23 to speed W2, are then fed to the lamination apparatus 29.

The lamination roll 36 and anvil 35 of the lamination apparatus 29, and hence the anode web 123, are shown moving at the speed W2. The individual cathode sheets 52, also moving at the speed W2, are laminated to the anode web 123 at a nip formed between the rubber-covered lamination roll 36 and the anvil 35. The difference between speeds W1 and W2, where speed W2 is greater than speed W1, creates a space 53 between adjacent cathode sheets during the lamination process. The laminated web 50 supported by a release liner of the anode web 123 is then fed to a second cutting station 40.

In many applications, a suitable speed ratio of the faster moving anode web 123 relative to the slower moving cathode web 23 (i.e., W2/W1) may vary between about 1.005 to about 1.05. For example, the speed W1 of the cathode web 23 may range between about 5 feet per minute (fpm) and about 500 fpm, and the speed W2 of the anode web 123 may vary between about 5.025 fpm and about 525 fpm, as long as W2/W1>1.

In one embodiment, the width of the cathode web 23 varies between about 0.75 inches and about 24 inches. The width of the anode web 123 may also vary between about 0.75 inches and about 24 inches. The length of each cathode sheet 52 may be varied between about 0.25 inches and about 24 inches. The spaces 53 created between adjacent cathode sheets may range between about 0.015 inches and about 0.4 inches. In an embodiment in which a lamination offset is created between the cathode and anode webs 23,123 during the lamination process, such a lamination offset may vary between about 0.04 inches and about 0.31 inches.

For purposes of illustration and not of limitation, an exemplary set of rotary converting process parameters are provided. In this illustrative example, it is assumed that the cathode web 23 is moved at a speed W1 of 50 fpm. The speed W2 of the anode web 123 is 51 fpm, thereby providing for a speed ratio of W2 to W1 of about 1.02. The length of each cut cathode sheet is 3.92 inches. The space 53 between adjacent cathode sheets 52 is 0.08 inches. The space between subsequent depth cuts through the anode-only portion of the web 54, but not through the anode carrier 51, is 4.0 inches. The width of the anode and cathode webs is 5.63 inches, respectively. The lamination offset is 0.24 inches, in accordance with this illustrative example.

FIGS. 3C–3F illustrate several rotary converting apparatus configurations that may be implemented in addition to that described above with respect to FIGS. 3A and 3B. FIGS. 3C–3F show four useful configurations having differing process speed relationships at three sections of the rotary converting apparatus. In particular, the speeds associated with a feed section 32', a cutting section 34', and a lamination section 36' are indicated as speeds WX, where X equals 1, 2, or 3. In general, but not necessarily, the relationship between speeds W1, W2, and W3 may be characterized as $W1 \leq W2 \leq W3$.

Figure 3C:
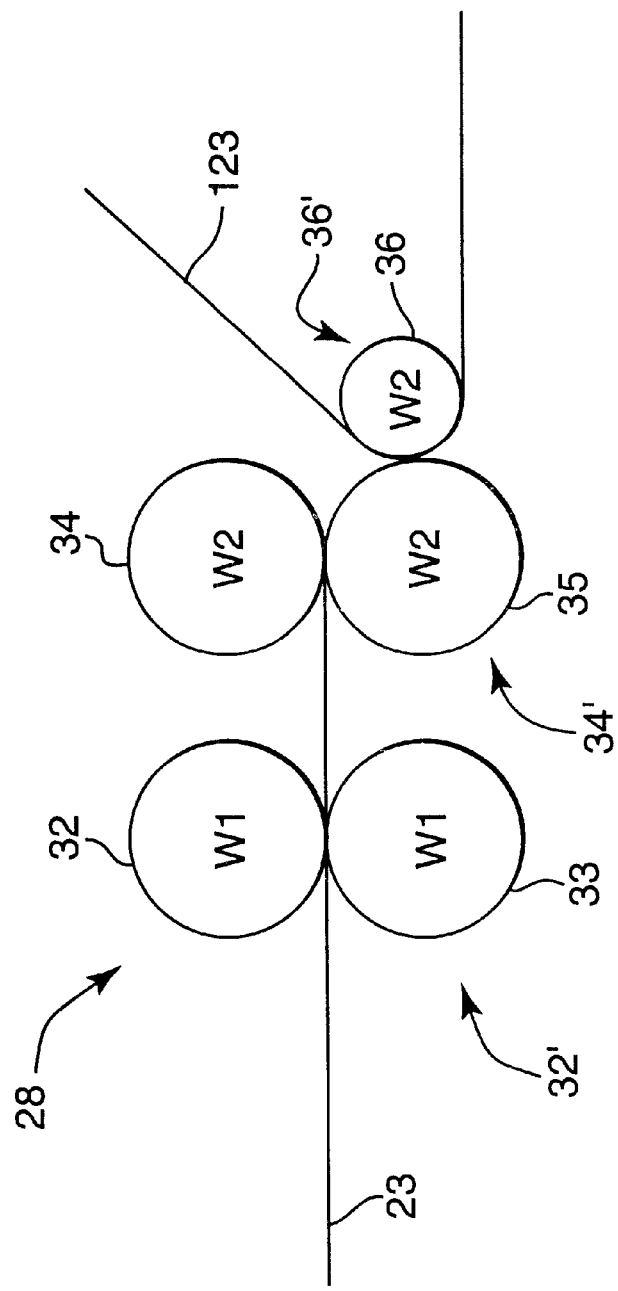
FIGS. 3C–3F show four embodiments of a rotary converting apparatus, each of which includes feed, cutting, and lamination sections capable of operating at the same or different processing speeds.

In FIG. 3C, for example, the speeds associated with each of the feed section 32', a cutting section 34', and a lamination section 36' according to this rotary conversion apparatus configuration are given as W1, W2, and W2, respectively. In this case, which is essentially the configuration discussed previously with respect to FIGS. 3A and 3B, W1 is less than W2.

Figure 3D:
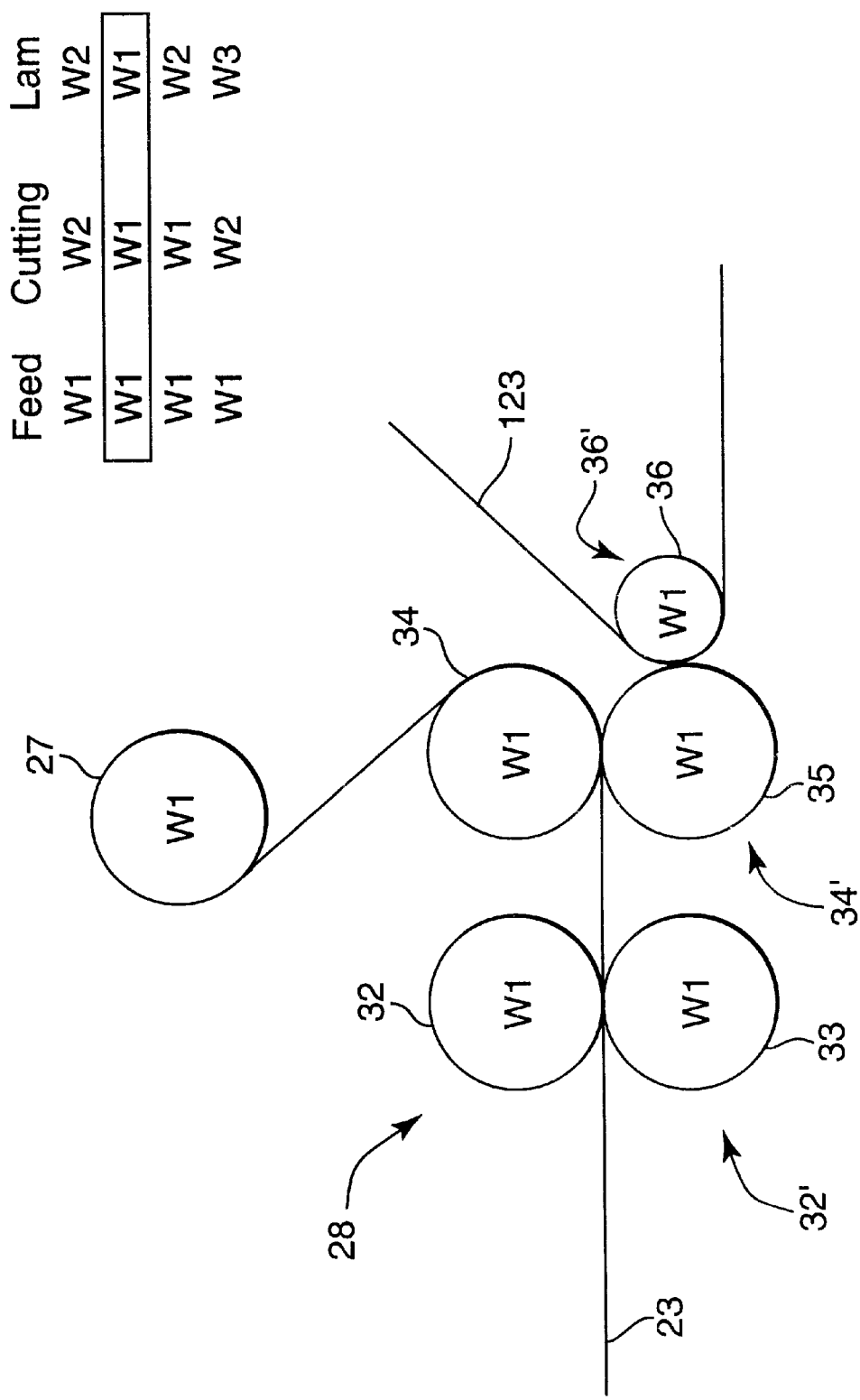

FIG. 3D depicts another rotary conversion apparatus configuration, wherein the speeds associated with each of the feed section 32', a cutting section 34', and a lamination section 36' are all substantially equal, such as speed W1 in this illustrative example. FIG. 3D further includes a wind roll 27 for taking up a liner at speed W1. This configuration is well suited for employment of a patterned rotary die, such as rotary die which includes a rectangular shaped die blade. According to this configuration, a rectangular die blade cuts a rectangular shaped cut into the web structure (e.g., a cathode layered structure) which, when removed, creates a gap between adjacent web structures. The excess or waste web matrix material may be rewound on the liner moving at speed W1 by use of wind roll 27.

Lamination of the web structure sheets passing though cutting section 34' at speed W1 to another web 123, such as a web of anode layered structure, may also occur at speed W1 at lamination section 36'. The rotary converting apparatus configuration depicted in FIG. 3D advantageously provides for the production of a desired gap between adjacent cathode layered structures, while providing for a substantially uniform process speed at each of the feed, cutting, and lamination sections 32', 34', and 36'.

Figure 3E:
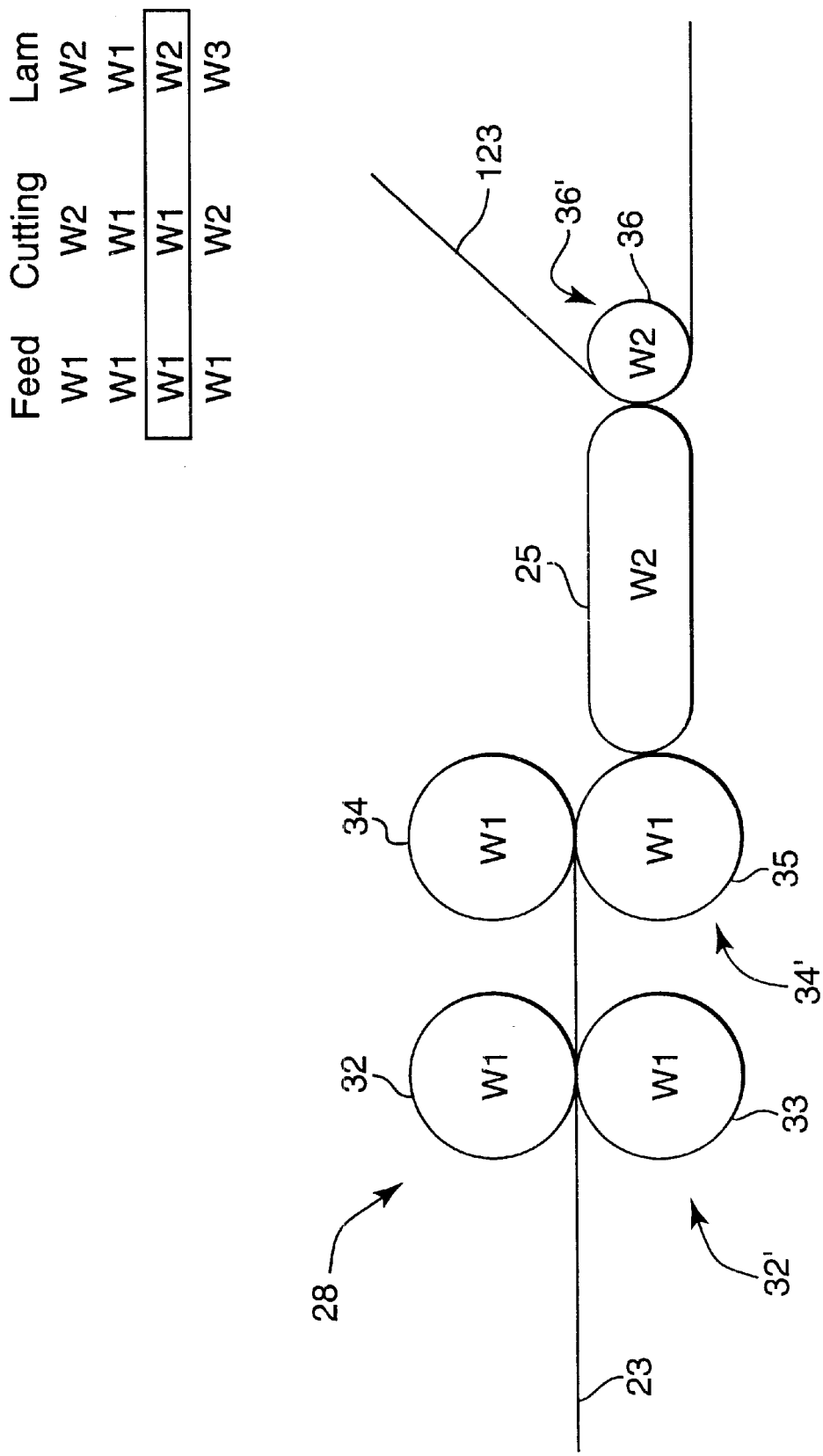

FIG. 3E illustrates a further rotary conversion apparatus configuration, wherein the speeds associated with the feed and cutting sections 32' and 34' are substantially equal, and the lamination section speed is shown as W2. In this configuration, a conveyor 25 is shown situated between cutting station 34' and lamination station 36'. The speed of the conveyor 25 is substantially the same as that of the lamination station 36', namely, W2.

Figure 3F:
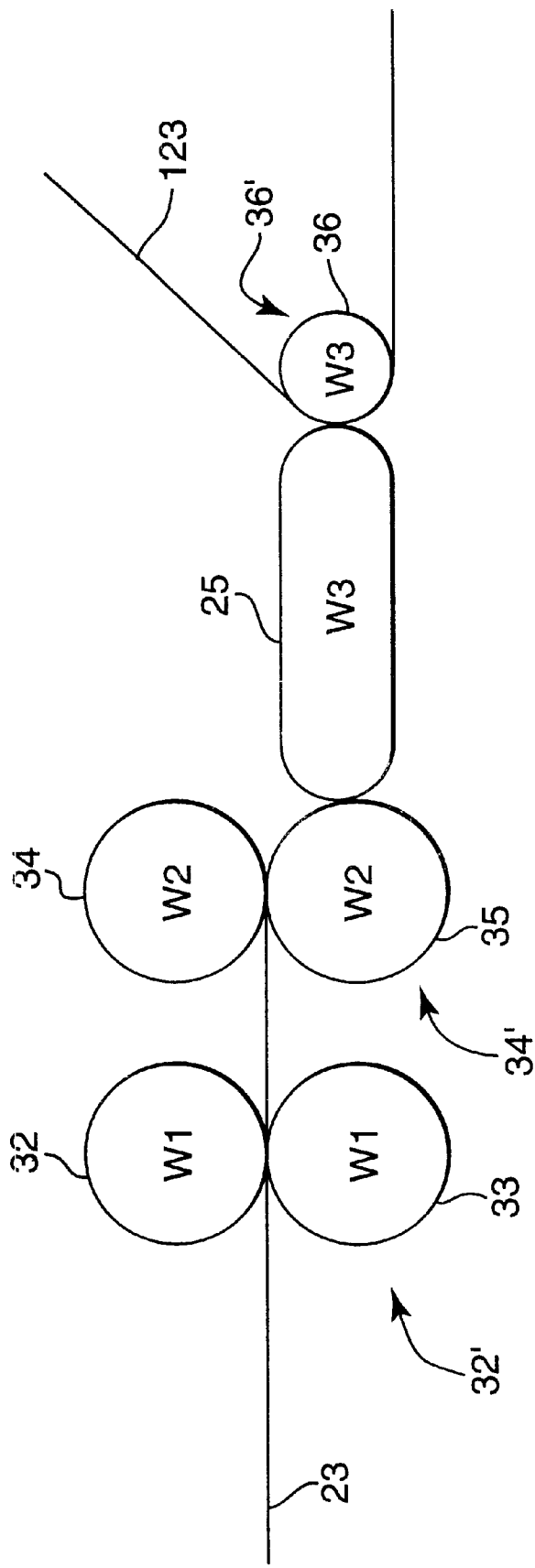

FIG. 3F shows yet another rotary conversion apparatus configuration, wherein the speeds associated with the feed, cutting, and lamination sections 32', 34', and 36' are different. In this particular example, the speeds associated with the feed, cutting, and lamination sections 32', 34', and 36' are shown as speeds W1, W2, and W3, respectively. A conveyor 25, situated between cutting station 34' and lamination station 36', is shown moving substantially at the same speed as the lamination station 36', namely, W3.

It can be seen that each of the rotary converting apparatus configurations depicted in FIGS. 3A–3F provide for a desired gap between adjacent web structures or sheets. The gap size or spacing between adjacent web structures/sheets may be varied by judicious selection of process speeds (e.g., speeds W1, W2, and W3) and/or die blade size, configuration, and spacing. As will be apparent from the discussion provided below, the gap provided between adjacent web structures/sheets facilitates processing of the laminated product (e.g., laminated unit cell) at a second cutting station.

It will be appreciated by one skilled in the art that an alternative "pick and place" lamination apparatus may be employed for transferring each web structure cut from the web at cutting station 34' to the second web 123 for lamination to the second web 123. According to this alternative approach, the lamination section 36' would be reconfigured as, or replaced by, the pick and place lamination apparatus.

Figure 4:
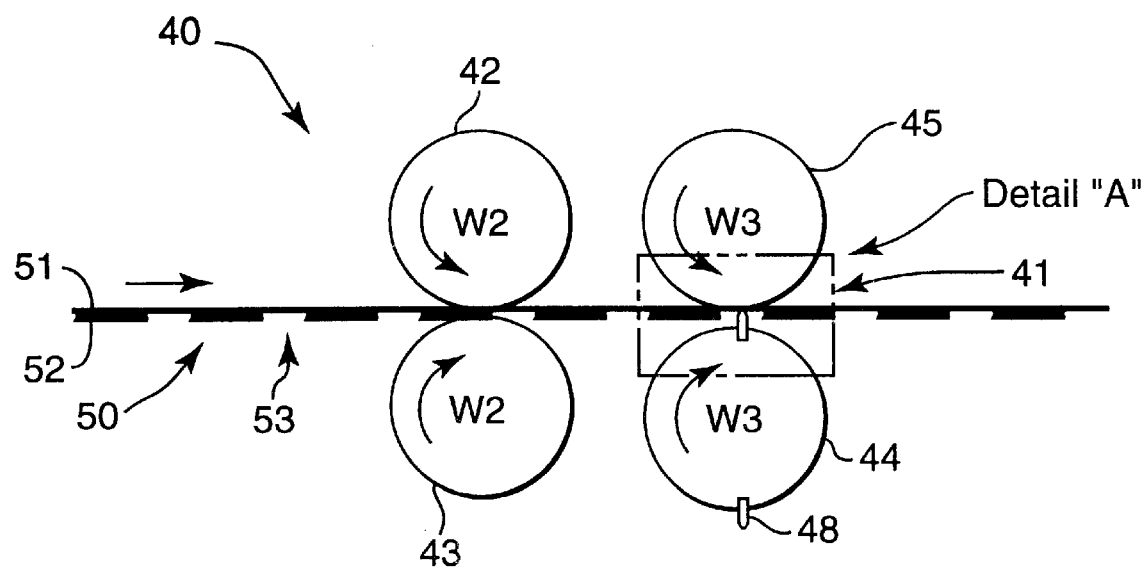
FIG. 4 is a sub-assembly of FIG. 2 that is a detailed illustration of a second rotary cutting interface of a rotary converting apparatus in accordance with an embodiment of the present invention.

FIG. 4 shows the second cutting station 40 depicted in FIGS. 1 and 2 in greater detail. As depicted in FIG. 4, a laminated web 50 is shown as a series of spaced-apart cathode sheets 52 laminated to an anode web 123 having a release liner 51. The laminated web 50 moves into the second cutting station at the speed W2. The anvil 45 and rotary die 44 of cutting roll apparatus 41 are moved at a speed W3, which is typically the same as W2, but variable in speed in order to consistently hit the space 53. For example, the speed W3 may vary between about 50 fpm and about 55 fpm. The diameter of the rotary die 44, the spacing between die blades 48, and the speeds W2 and W3 are appropriately selected so that each die blade 48 rotates into cutting engagement with the lamination web 50 only within the spaces 53 between adjacent individual cathode sheets 52. A detailed showing of cutting roll apparatus 41 within region "A" of FIG. 4 is provided in FIG. 5.

Figure 5:
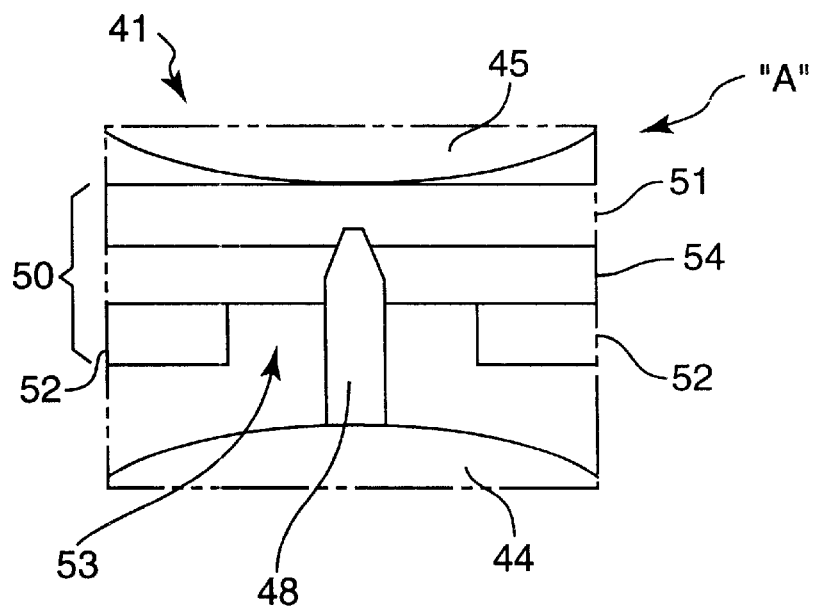
FIG. 5 is a detailed depiction of the second rotary cutting interface shown in FIG. 4.

FIG. 5 shows a portion of laminated web 50 within a rolling cutting interface defined between the anvil 45 and rotary die 44. A die blade 48 of the rotary die 44 is shown cutting through the anode web material 54 within the space 53 created between adjacent individual cathode sheets 52. The die blade 48 is shown cutting entirely through the anode material layer 54 but penetrating into only a portion of the release liner 51. It is noted that a precision controlled depth cut may provide for little or virtually no penetration into the release liner 51.

As was discussed previously, the second cutting station 40 shown in FIG. 4 produces a series of laminated unit cell sheets supported on a releasable liner at its exit. The laminated unit cell sheets may be wound on a take-up roll for later processing by a stacking apparatus or fed directly to a stacking apparatus as part of a continuous rotary converting/stacking operation.

The construction of the anode and cathode webs 123, 23, as was discussed previously, may be varied in terms of materials, number of layers of material, and alignment, size, and shape of such material layers. By way of example, the construction of the cathode web 23 may include an aluminum foil having a cathode coating on both sides. The anode web 123 in this example may have a polyethylene/SPE/lithium foil/SPE construction, where SPE refers to a solid polymer electrolyte.

By way of further example, the cathode web 23 may include a cathode/carbon coated aluminum foil/cathode construction. The anode web 123 in this example may have a polyethylene/SPE/lithium foil/SPE construction.

It will be appreciated that a rotary converting apparatus and methodology of the present invention may be employed to laminate a wide variety of sheet materials, and is not limited to utilization only with thin-film electrochemical cells. Moreover, the rotary lamination process need not provide for the creation of a space between web material sheets which are processed by the first cutting station 28, although the provision of such spaces is advantageous in certain applications (e.g., production of thin-film electrochemical cells).

A stacking apparatus and methodology of the present invention provides for the continuous stacking of laminated products of varying types, sizes, and shapes, such as by use of a rolling lamination interface. In general terms, a series of flat pucks, pallets, or carriages are routed continuously through a nip to build up precision laminated stacks of the product in sheet form on the top surfaces of the pucks. Sheets of product are transferred from a releasable web liner to the pucks in a continuous successive or alternating manner to produce a stack of product sheets to a desired height. Several embodiments of stacking apparatuses and processes are described hereinbelow, which are generally categorized as either "DL" (direct lamination) or "VL" (vacuum lamination) apparatuses and processes.

In accordance with a DL methodology, product sheets are transferred from a releasable web liner directly to the pucks in a direct lamination approach. In accordance with a VL methodology, product sheets are first transferred from a release liner to a vacuum roll, then laminated to the pucks in an indirect lamination approach. It is noted that either side of the product sheets may be tacky. Also, other non-tacky forms of stacking may be employed, such as by use of hook-and-loop, electrostatic, magnetic or mechanical gripper mechanisms, for example. The rolling lamination processes of the present invention for assembling material layers, two embodiments of which are the DL and VL approaches described herein, advantageously provide for the removal of air within the laminate structure.

The product supplied to the lamination process may be in the form of a tape on a release liner. Controlled depth cuts through the product down to the liner separates the product into individual product sheets. In one approach, it is assumed that there is no space created between adjacent product sheets. This reduces waste as compared to classical labeling processes in which weed is removed. The stacking process may be designed to accommodate the lack of space between adjacent product sheets and the accumulation of small variations in product sheet length. In another approach, as discussed above, a space may be created between at least some of the layers of adjacent multilayer product sheets.

Figure 6:
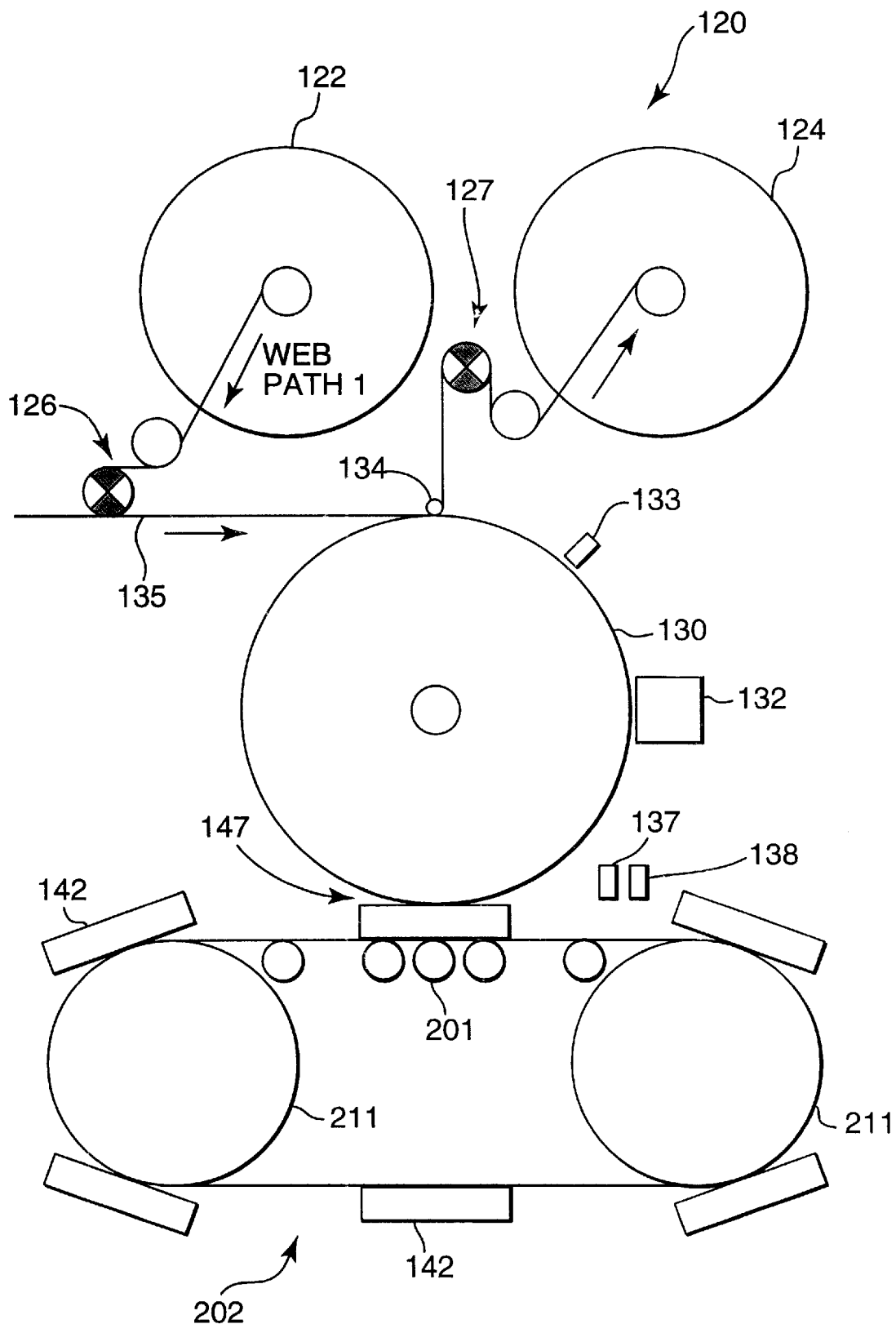
FIG. 6 is a sub-assembly of FIG. 1 that illustrates a stacking apparatus in accordance with an embodiment of the present invention.

Turning now to FIG. 6, there is depicted a VL stacking apparatus 120 for producing stacks of product sheets on a continuous basis in accordance with one embodiment of the present invention. According to this embodiment, the product web 135 fed to the VL stacking apparatus 120 may be produced by an upstream rotary converting apparatus 20, such as that described hereinabove. Alternatively, the product web 135 may be provided by a separate feed roll. It is assumed that the product web 135 includes individual sheets of product or packaging (e.g., electrochemical unit cells) which are releasably attached to a release liner of the product web 135, such as that produced by the second cutting station 40 described previously hereinabove.

In accordance with the VL stacking process depicted in FIG. 6, a lamination nip 147 is formed between a vacuum roll 130 and each of a series of moving pucks 142. Individual sheets of product or packaging, which preferably include a side of tacky material, are carried into the nip 147 tacky side out via the vacuum roll 130.

The product sheets are spaced on the vacuum roll 130 in a manner that facilitates machine timing. The product sheets are received on the vacuum roll 130 as they are stripped off the releasable liner of the product web 135 at a small radius peel point provided at an interface between the vacuum roll 130 and a stripper roll 134. At the stripper roll 134, the product sheets are transferred off the releasable liner, spaced, and transferred onto the vacuum roll 130. The release liner is fed to a take-up roll 124.

At the six o'clock position on the vacuum roll 130, the product sheets are transferred off the vacuum roll 130 and onto growing stacks on the pucks 142, which are shown generically as rectangles in FIG. 6.

FIG. 6 shows a web path (Web Path 1) that is depicted as unwinding toward the vacuum pull roll 130. This web path may be used to decouple the stacking apparatus 120 from the rotary converting apparatus 20. For example, the laminated web produced at the output of the rotary converting apparatus 20 may be wound up on one day, and unwound and processed by the stacking apparatus 120 the next day.

The pucks 142, according to one embodiment, are driven into the nip 147 via a timing belt or chain driven conveyor 202 in a continuous looping manner. In this particular embodiment, and as is further shown in FIGS. 8A and 8B, the spaced-apart pucks 142 travel across the top of conveyor 202 in a desired direction, along an arcuate path along one side of the conveyor 202, along a bottom section of the conveyor 202, and return to the top of the conveyor 202 along an arcuate path along the other side of the conveyor 202. The pucks 142 may be moved along a continuous path on the conveyor 202 or, in accordance with another approach, may be moved along a continuous path by use of a reciprocating conveyor.

It is understood that more than one VL lamination stacking apparatuses 120 may be employed for producing stacks of product sheets on a continuous basis. In the case of two VL lamination stacking apparatuses 120, for example, each apparatus 120 may laminate the same or different material layers of the same of different size/shape to pucks 142.

Figure 7A:
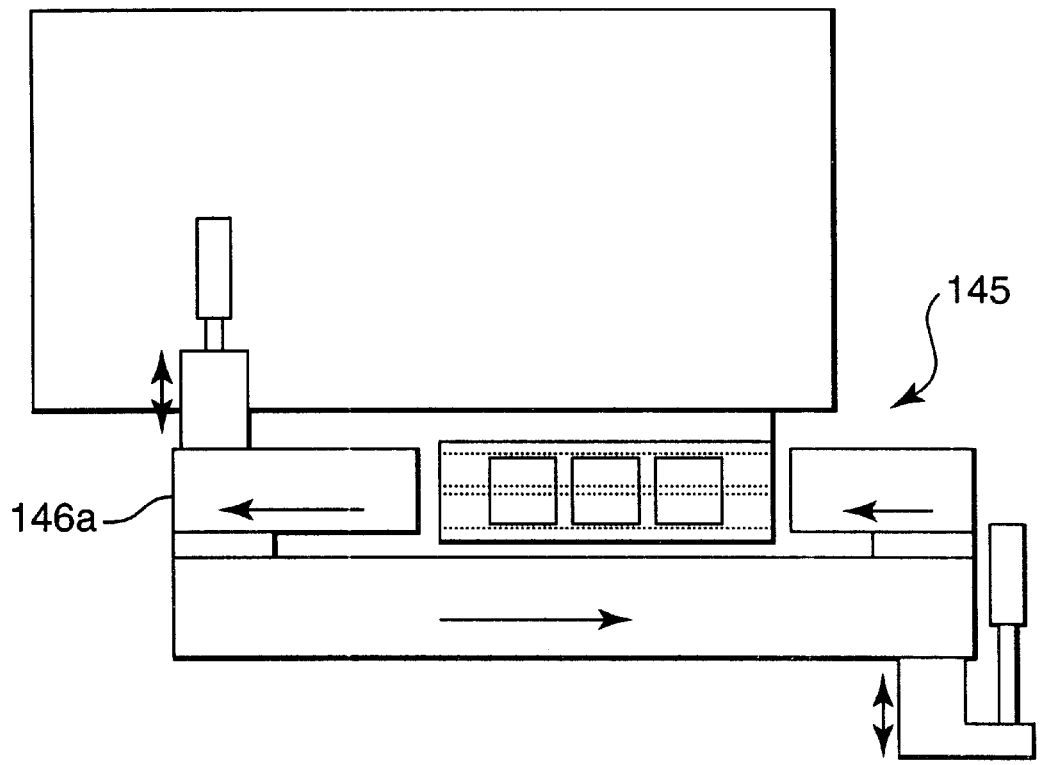
FIGS. 7A and 7B illustrate a portion of a stacking apparatus in accordance with an embodiment of the present invention.
Figure 7B:
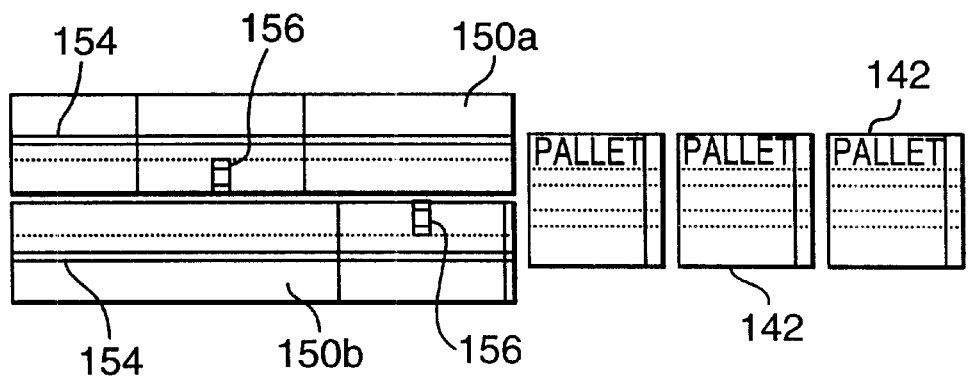

In another embodiment, and as best seen in FIGS. 7A and 7B, the pucks 142 are driven into the nip 147, shown in FIG. 6, via a reciprocating conveyor 146a in a continuous looping manner. In this embodiment, a pair of reciprocating linear motors 150a, 150b operate below the plane of the pucks 142. While the first motor 150a is driving a puck 142 forward into the nip 147, the second motor 150b is braking the queue.

The leading motor 150a trims the speed and position of the leading puck 142 before it enters the nip 147. When the leading puck 142 enters the nip 147, the leading motor 150a releases and makes a quick, empty return trip to engage the second puck 142 back in the queue. To engage the second puck 142, the leading motor 150a matches speed and position with the moving puck 142 (i.e., the pucks 142 one puck length back from the first pucks in the queue) and actuates a gripper 156 which grips a gripper hold projecting from the bottom of the puck 142.

The puck 142 exiting the nip 147 is pushed around a conveyor loop to make its way back to the end of the queue.

This puck 142 rides on its bottom flat side on the reciprocating conveyors 146a. At the transition from the last conveyor to the rail or bearing section, shown as including linear bearing guides 154, a positional tolerance is required to engage the linear bearing guides 154. Once on the linear bearing guides 154, the pucks 142 self align.

The tandem linear motors 150a, 150b and grippers 156 move in a reciprocating manner, while the pucks 142 move in continuous motion. Speeds of about 300 laminations per minute are realizable with motor accelerations of about 40 m/s$^2$. This level of productivity is feasible using commercially available components. These estimates are based on pucks 142 having a length of about 100 mm, which provides for nominal line speeds of about 30 meters per minute.

As is further shown in FIG. 6, optical sensors 138, 133 sense the pucks 142 and the product sheets on the vacuum roll 130 as required. The linear motors 150a, 150b typically employ linear encoders for position feedback.

Within the context of a broader process, filled pucks 142 are routed to finishing stations, while empty pucks 142 are inserted into the stacking loop. Relatively high nip pressures may be required to properly form certain types of products, such as a battery or fuel cell, for example. Medical products and packaging applications may not require such high forces. The implementation shown in FIGS. 7A and 7B is designed to provide good mechanical support under the nip 147, where the total force may be 600 pounds or more.

As is depicted in FIGS. 7A and 7B, the pucks 142 move from right to left in a continuous motion. Under the nip 147, the pucks 142 are supported on roundway bearings and rails, or on cam followers running in a machined raceway. Either of these options allow the pucks 142 to transfer between the conveyor 146a and linear bearing guide 154. These bearings or cam followers may be implemented to be independent of the linear motor bearings, and may therefore be sized as needed to bear the lamination load. The bearings or cam followers may travel with the pucks 142, or may be stationary and arranged to form an "active" track for the pucks 142.

The conveyor 146a before the rail/guide section, or lamination table 145, drives the entire queue of pucks 142 in a forward direction at the nominal line speed. Vertical control of the nip 147 may be provided via the vacuum roll section. Vertical control is required to accommodate the growing height of product or package on the pucks 142. Either the top of the pucks 142 or the vacuum roll 130 itself may be covered with a compliant material.

In a design that utilizes linear motors 150a, 150b, the linear bearing guides 154 supports independent bearings which support both the coils and the grippers 156. If the linear bearing guides 154 are sufficiently strong to support the lamination force, the cam followers and machined raceways may be eliminated. In this case, the grippers 156 would carry the puck 142 entirely through the nip 147, which makes the trajectory somewhat longer.

In another embodiment, a vacuum roll 130 would not be used. The pucks 142 would pass directly under a peel station, or another sheet feeding mechanism, where the leading edge of the product sheet would be tacked to the leading edge of the stack. This approach is not unlike those employed in a labeling machine. The puck may then be driven through a nip to complete the lamination.

Figure 8:
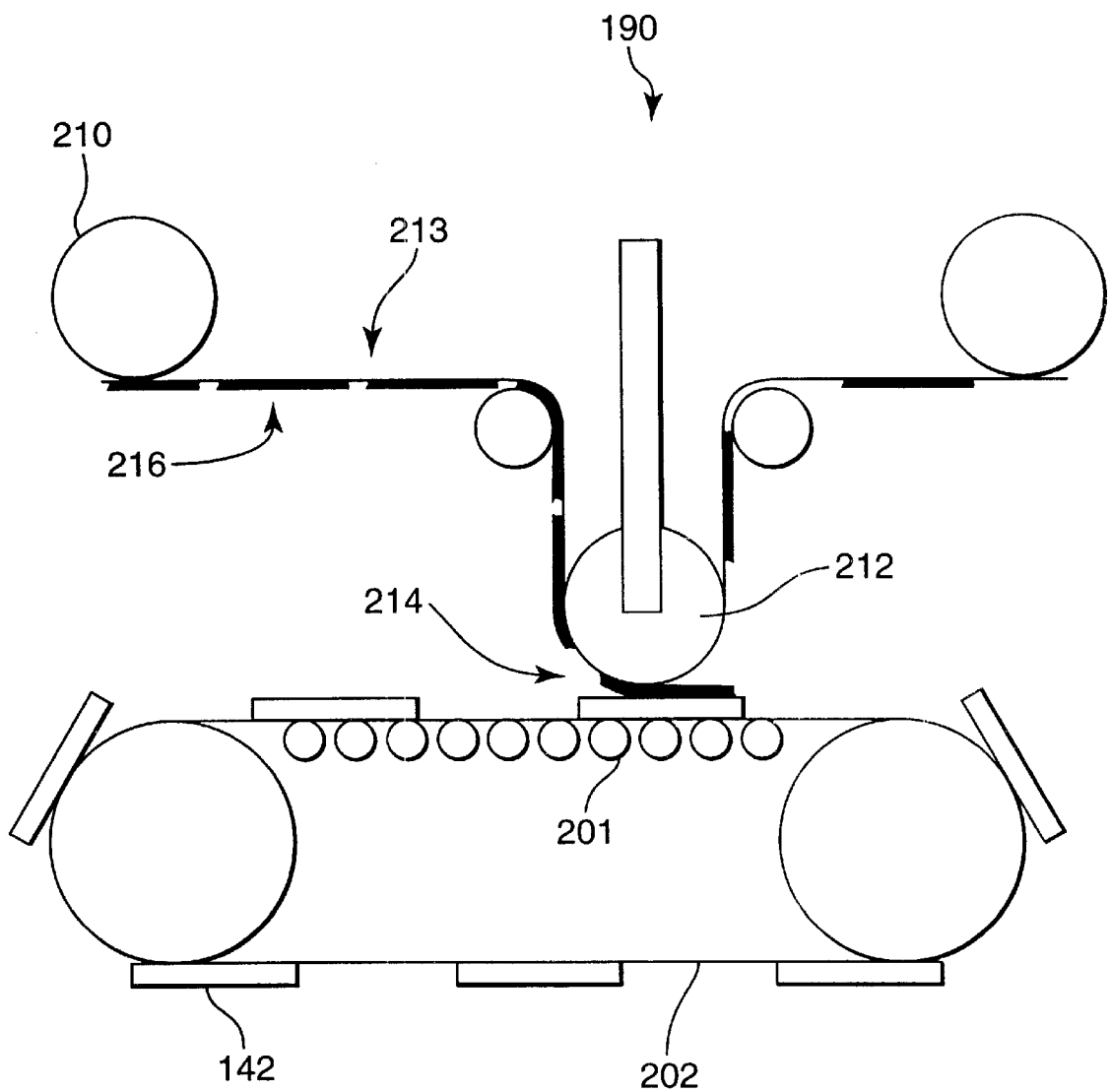
FIG. 8 illustrates a stacking apparatus in accordance with another embodiment of the present invention.

FIG. 8 illustrates an embodiment of a DL apparatus 190 in which product sheets are transferred from a releasable web liner to pucks 142 in a direct lamination approach. The direct lamination apparatus 190 shown in FIG. 8 includes a conveyor 202 about which a number of pucks or carriages 142 move in a recirculating manner.

In this particular embodiment, the spaced-apart pucks 142 travel across the top of conveyor 202 in a desired direction, along an arcuate path along one side of the conveyor 202, along a bottom section of the conveyor 202, and return to the top of the conveyor 202 along an arcuate path along the other side of the conveyor 202. The pucks 142 may be moved along a continuous path on the conveyor 202 in a manner described previously with respect to a VL approach. It will also be appreciated that a DL process may alternatively employ a reciprocating conveyor of the type previously described.

As is depicted in FIG. 8, a nip 214 is formed between a lamination roll 212 and each of the pucks 142 as the pucks 142 move into proximity with the lamination roll 212. In this embodiment, a product web 213 is unwound from a feed roll 210 and directed to a nip 214 formed between a lamination roll 212 and each puck 142 as the pucks 142 are moved into proximity with lamination roll 212. One or more support rollers 201 may be situated on the conveyor 202 to provide for relatively high lamination forces developed between the lamination roll 212 and pucks 142.

As each puck 142 passes into proximity with the lamination roll 212 to form nip 214, a product sheet 216, such as an electrochemical unit cell sheet, is transferred from the web to the puck 142. This puck 142 is moved along the conveyor out of proximity with the lamination roll 212, and the next puck 142 moves into proximity with the lamination roll 212 to form nip 214. A product sheet 216 is transferred from the web to this puck 142. This process is repeated a number of times in order to construct a stack of product sheets on each of the pucks 142 that are recirculating under the lamination roll 212. Vertical control of the nip 214 is provided to accommodate the growing height of product or package on the pucks 142.

It is desirable, but not required, that the pucks 142 fixed to, or otherwise traveling on, the conveyor 202 have a length greater than that of one product sheet/stack. In one embodiment, the length of a puck 142 is about 4 inches (e.g., 4.09 inches) the width of the puck 142 is about 6 inches (e.g., 5.91 inches). The spacing between individual pucks 142 is approximately equal to one product sheet/stack length.

In accordance with one implementation, the product web 213 may be moved at speeds ranging between 0 and 10 meters/minute. The product web width may be about 8 inches. The product sheets may be electrochemical unit cell sheets having a length of up to about 17 inches.

In the embodiment depicted in FIG. 8, only one lamination station is employed. As such, only alternating product sheets releasably affixed to the web are transferred to the pucks 142, leaving every other product sheet affixed to the web. These unused product sheets may be wound up with the liner during a first pass through the DL apparatus 190, and run through during a second pass to transfer the remaining product sheets to respective pucks 142 for 100% utilization.

The adhesion of the top of the first product sheet layer laminated to the puck 142 and the non-tacky side of the product sheet must be high enough to cleanly pull the product sheet from the release liner of the web. The adhesion of the bottom of the first layer to the top of the puck 142 must be high enough to anchor the stack through the balance of the process, yet release easily on demand. In the case of an electrochemical cell construction, for example, this first layer may be a tacky electrolyte/lithium foil/tacky electrolyte structure, and the top of the puck 142 may include a thin layer of an inert, releasable, dielectric material. In this case, each subsequent layer typically has a cathode/current collector/cathode/electrolyte/lithium foil/electrolyte structure.

In one embodiment, the adhesion of the product sheets to the release liner of the web typically ranges between about 2 grams/inch and about 100 grams/inch. The product-sheet to product-sheet adhesion typically ranges between about 300 grams/inch and about 1200grams/inch.

Differences between a first layer and subsequent layers in a DL lamination process will likely necessitate a roll change or splice after all pucks 142 make a first priming pass through the nip 214. After the product stack is completed, the pucks 142 are unloaded. This may be facilitated either manually or through use of an automated unloading process. Detaching a product stack from the pucks 142 may, for example, be accomplished through use of a releasable adhesive between the puck surface and the adjacent product stack layer, such as a thin layer of an inert releasable, dielectric material mentioned previously. By way of further example, a vacuum mechanism, which may be used to anchor the product stack to the puck surface during the stacking process, may be operated to produce a back pressure on the product stack to facilitate unloading of the product stack from the puck.

According to one embodiment, the lamination roll 212 is rubber covered. The pucks 142 are essentially flat and rigid. As the rubber-covered lamination roll 212 deforms in the nip 214, the product stack remains substantially flat and relatively unstressed, which is generally advantageous. A coating provided on the top of the puck 142 can be sufficiently thin to allow heat transfer from a shorted cell into the puck 142, which represents a potential safety advantage if such shorting occurs. Also, because the release liner is not flexed around a peel point in this embodiment, the liner could potentially be reused, thereby providing a cost savings. Further, the product sheets are always in positive contact with either the web liner or the puck 142, or both, and hence are unlikely to get out of alignment or registration. Moreover, a vacuum roller is not required according to this embodiment, which provides for additional potential cost savings.

Puck sensors and product sensors are preferably used to maintain the registration of the product sheets on the pucks 142 and to adjust the position of DL roll 212 to accommodate the growing height of the stack. These sensors facilitate fine-tuning of the speed and position of the chain drive, and, therefore, the pucks 142 relative to the product sheets affixed to the web. A timing belt or another servo system may be used in place of the chain driven conveyor 202, and in an advanced process, the pucks 142 need not necessarily be fixed to the conveyor 202.

Figure 9:
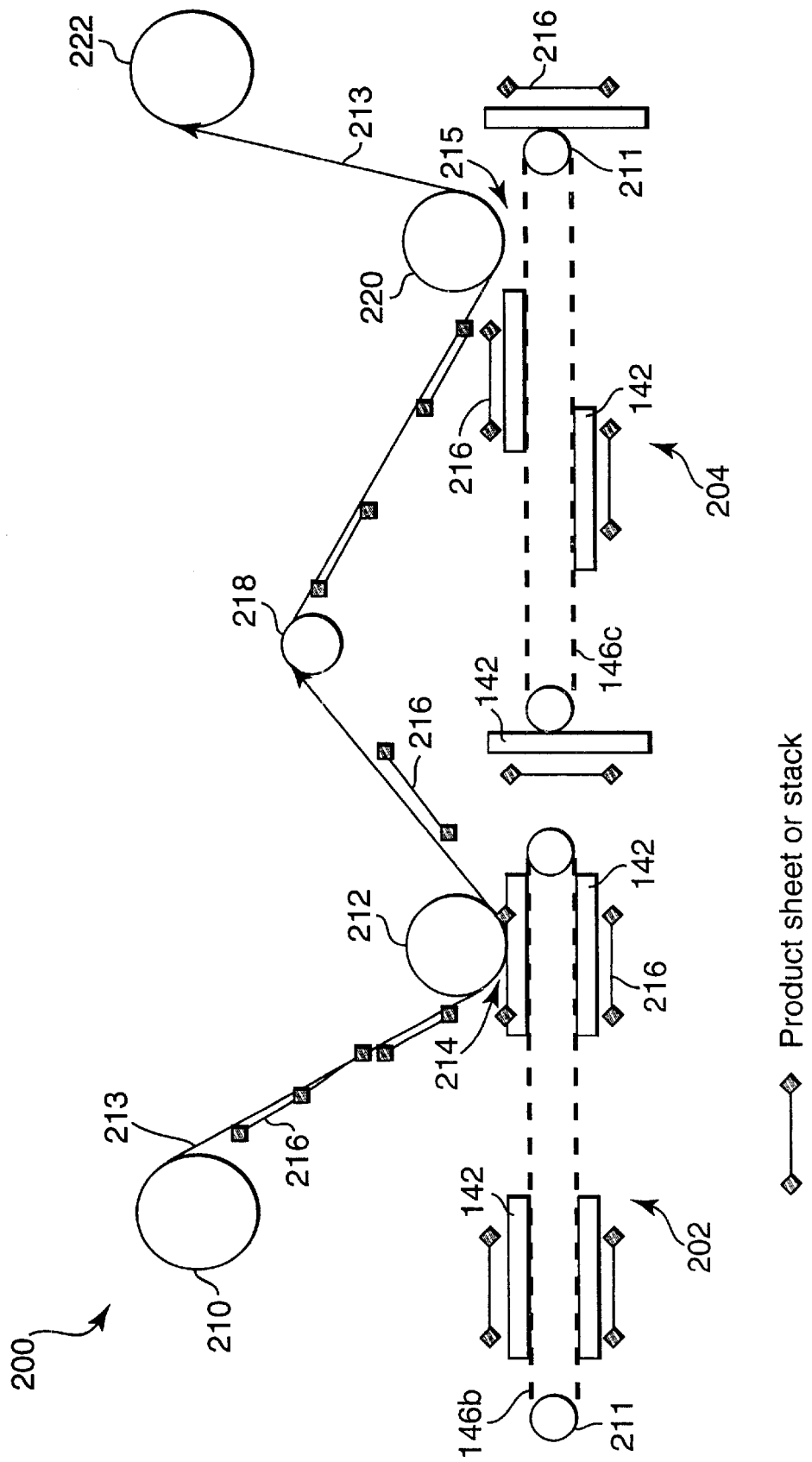
FIG. 9 illustrates a multiple-station, single-product web stacking apparatus in accordance with an embodiment of the present invention.

FIG. 9 illustrates a DL apparatus 200 that includes two lamination stations 202 and 204 in accordance with another embodiment of the present invention (e.g., single product web, dual lamination stations). FIG. 9 shows a DL process which runs from left to right. Two lamination stations 202 and 204 are provided, which respectively laminate alternating product sheets 216 transferred from a carrier web 213 to a set of recirculating pucks 142. More particularly, a first lamination station 202 transfers every other product sheet to its respective pucks 142, while the second lamination station 204 transfers the remaining product sheets to its respective pucks 142. In the embodiment shown in FIG. 9, each of the lamination stations 202, 204 includes a chain driven conveyor 146b, 146c.

A carrier web 213 of product sheets 216 is unwound from a feed roll 210. The carrier web 213 of cut product sheets 216 may be produced using a rotary converting apparatus and method as discussed previously. The carrier web 213 passes into a nip 214 successively formed between a first lamination roll 212 and each of the pucks 142 at the first lamination station 202. Because of the spacing provided between pucks 142 moving on conveyor 146b of the first lamination station 202, alternating product sheets 216 are transferred from carrier web 213 to pucks 142 as carrier web 213 is unwound from the feed roll 210 and wound on a take-up roll 222 during the DL process.

A second nip 215 at the second lamination station 204 is formed between a second lamination roll 220 and each of the pucks 142 recirculating about conveyor 146c. The product sheets 216 remaining on the carrier web 213 after passing through the first lamination station 202 are transferred from the carrier web 213 to pucks 142 of the second lamination station 204. As such, stacks of product sheets are developed on pucks at each of two lamination stations during a continuous DL process. It is noted that the product sheets 216 releasably affixed to the carrier web 213 may be situated on carrier web 213 with or without a spacing provided between adjacent product sheets 216.

It will be appreciated that more than two lamination stations may be employed, and that process parameters such as web speed, product sheet size, and puck spacing can be properly adjusted to facilitate the additional lamination stations. Puck sensors and product sensors are preferably used to maintain the registration of the product sheets on the pucks 142. These sensors facilitate fine tuning of the speed and position of the conveyors 146b, 146c (e.g., chain drives) independently. A timing belt or another servo system may alternatively be used in place of a chain driven conveyor 146b, 146c.

Figure 10:
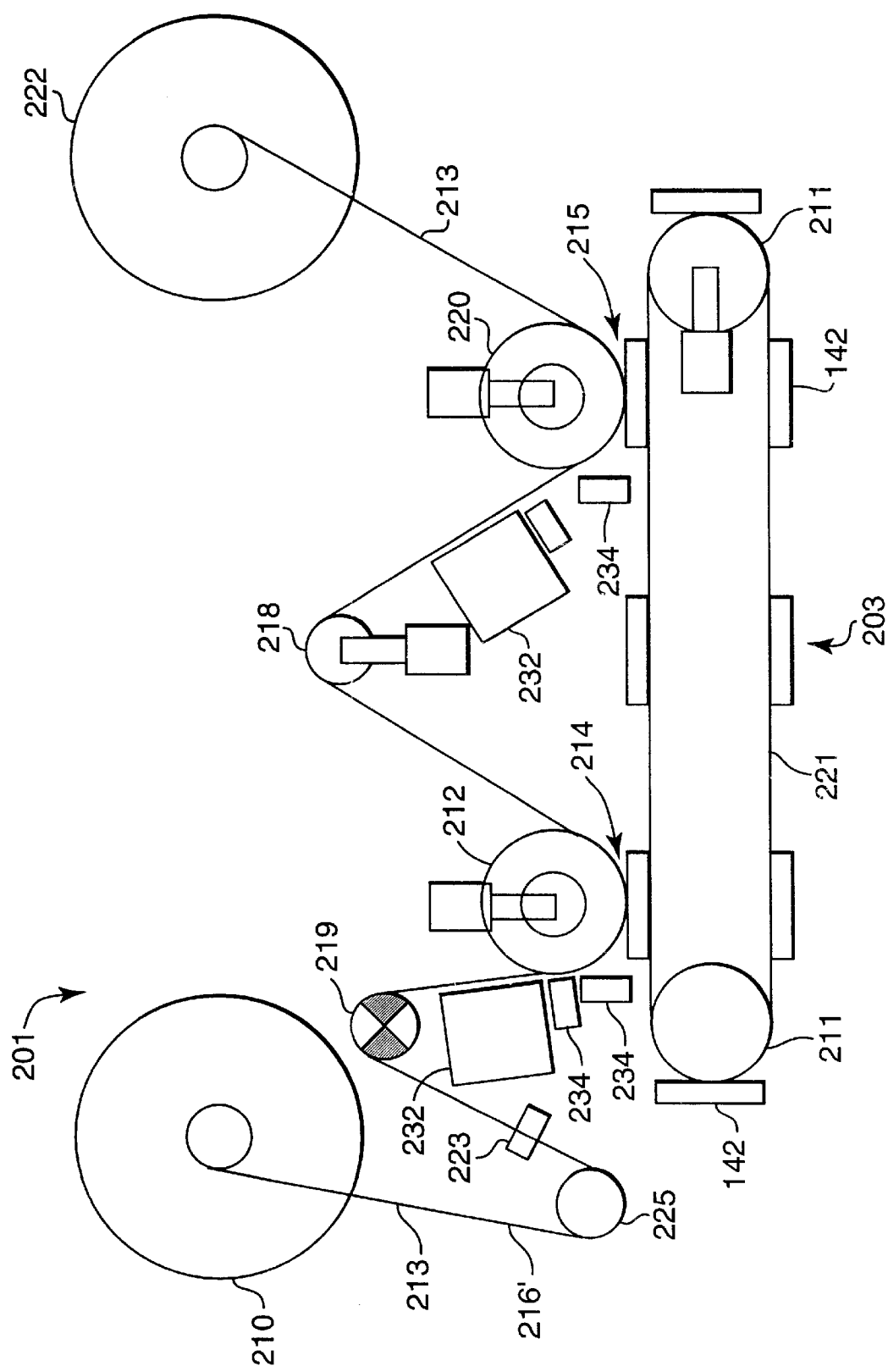
FIG. 10 illustrates a single-station, single-product web stacking apparatus in accordance with an embodiment of the present invention.

FIG. 10 illustrates a DL apparatus 201 in accordance with another embodiment of the present invention. This embodiment illustrates a dual lamination station-single conveyor DL apparatus implementation. As depicted, DL apparatus 201 includes a single lamination station 203 which includes a conveyor 221. A web 213 of product sheets 216 is unwound from a feed roll 210 and passes between a first lamination roll 212 and a series of recirculating pucks 142. Alternating product sheets 216 are transferred from the web 213 to the moving pucks 142 at a first nip 214. The remaining product sheets 216 are transferred to moving pucks 142 at a second nip 215 formed between a second lamination roll 220 and each of the pucks 142. The release liner is then wound on a take-up roll 222.

According to one DL implementation employing the apparatus 201 shown in FIG. 10, the carrier web 213 is a release liner upon which precut electrochemical unit cell sheets 216 incorporating alternating sheets of cathode/current collector/cathode and separator/anode/separator structures in one stack are releasably supported. Alternatively, the carrier web 213 may support precut electrochemical unit cell sheets 216 incorporating alternating sheets of separator/anode/separator and cathode/current collector/cathode structures in one stack.

In accordance with one implementation, the product web 213 may be moved at speeds ranging between 0 and 10 meters/minute. The product web width may be about 8 inches. The unit cell sheets may have a length of up to about 17 inches.

FIG. 10 also shows several additional components that may be used in other embodiments, such as those depicted in FIGS. 8 and 9 discussed previously. DL apparatus 201 may include a web guide 223 to assist with web alignment as the web passes over a tension roll 219. An IR heater 232 may be used to heat product sheets 216 to a desired temperature. Alignment sensors 234, such as optical sensors, may be employed to detect the position of the product sheets 216 on the carrier web 213 and the speed and position of the pucks 142 and/or chain drive/conveyor 221. The conveyor 221 may include one or more servo controlled drive rollers 211 to facilitate adjustment of conveyor speed during the DL process. As in other embodiments, vertical control of the lamination rolls 214, 215 is provided to accommodate the growing height of product or package on the pucks 142. Alternatively, the cell height can be accommodated by adjusting the height of the puck.

Figure 11:
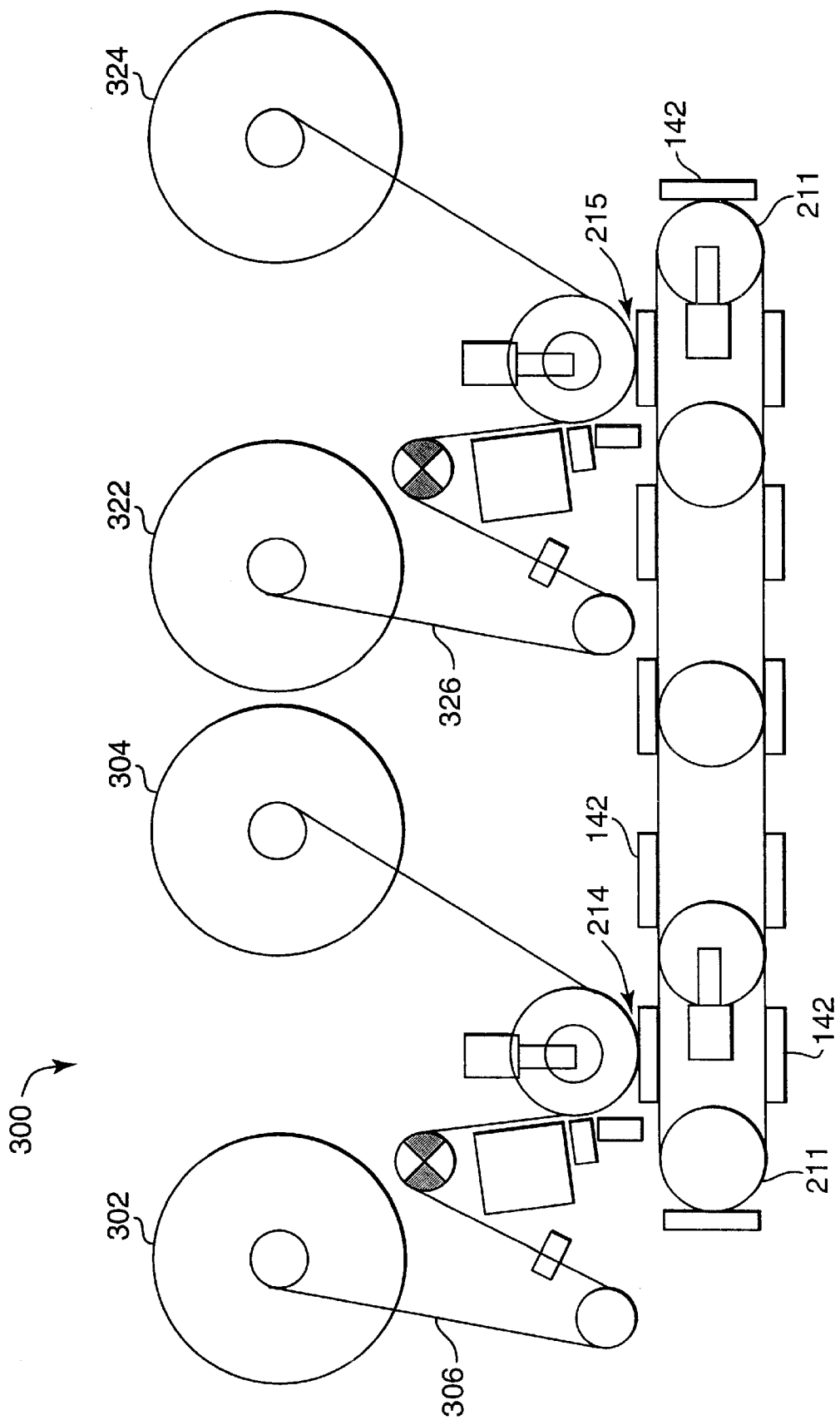
FIG. 11 illustrates a multiple-station, multiple-product web stacking apparatus in accordance with an embodiment of the present invention.

FIG. 11 illustrates yet another embodiment of a DL apparatus 300 in accordance with the principles of the present invention. According to this embodiment, multiple product webs 306, 326 are respectively passed through multiple lamination nips 214, 215 to construct stacks of sheet product or packaging on a series of continuously moving recirculating pucks 142. As shown, product web 306 includes product sheets that differ from those removably affixed to product web 326, it being understood that the two product webs 306, 326 may support the same type of product sheets. As is further shown, each product web 306, 326 has only one associated lamination nip 214, 215, such that every other product sheet is transferred to respective pucks 142 at each nip 214, 215. It is understood that two lamination nips may be provided for each product web 306, 326 so that all product sheets of a given web are transferred to respective pucks during a single pass. It is further understood that more than two lamination nips may be provided for each product web 306, 326 so that all product sheets of a given web are transferred to respective pucks during a single pass.

One advantage realizable when implementing a DL methodology according to this embodiment concerns the ability to alternate lamination of each product sheet supported on webs 306, 326 independent of which product sheet is first transferred to the pucks 142. By way of example, product web 306 may releasably support electrochemical anode product sheets, which include a separator/lithium foil/separator structure. Product web 326 may releasably support electrochemical cathode product sheets, which include a cathode/current collector/cathode structure. The anode product sheets, for example, may be first laminated to the pucks 142 followed by cathode product sheets to construct a stack of alternating anode/cathode product sheets.

In accordance with one implementation, the product web 306 may be moved at speeds ranging between 0 and 10 meters/minute. The product web width may be about 8 inches. The unit cell sheets may have a length of up to about 17 inches. The product web feed rolls 302 and 322 may each have a diameter of up to about 18 inches.

Figure 12A:
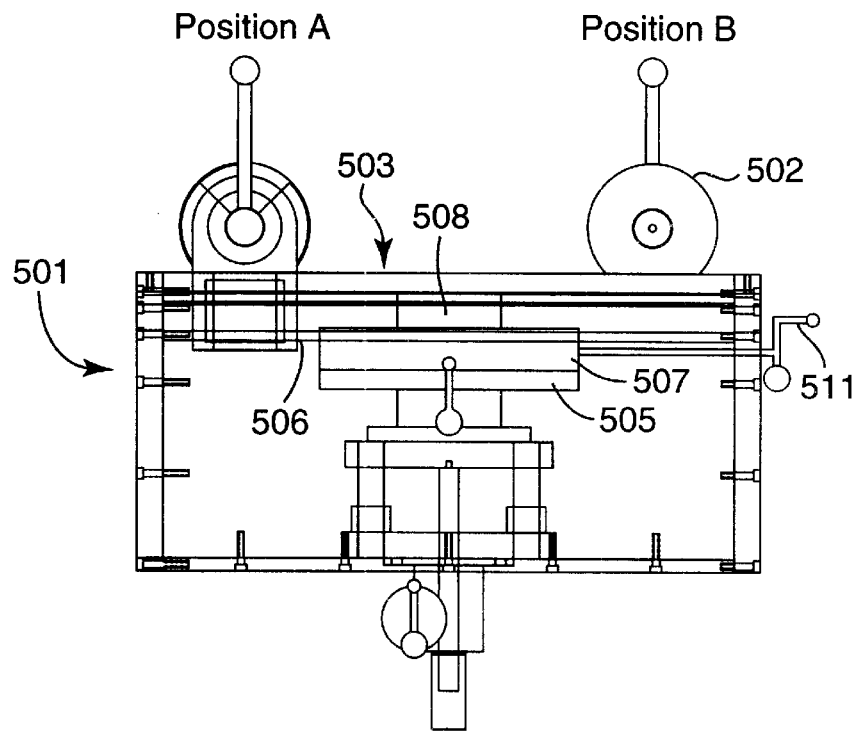
FIGS. 12A and 12B illustrate a rotary converting/lamination apparatus in accordance with another embodiment of the present invention.
Figure 12B:
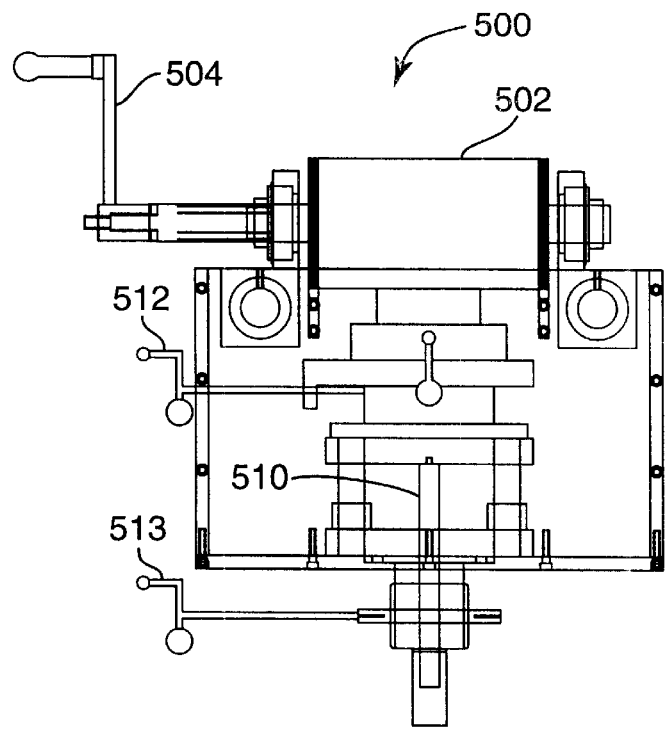

Referring now to FIGS. 12A and 12B, there is illustrated a stacking/lamination apparatus 500 according to another embodiment of the present invention. According to this embodiment, the stacking/lamination apparatus 500 may be employed to produce laminate stacks of materials with a high degree of precision. The materials processed by the stacking/lamination apparatus 500 may include material layers having differing dimensions and ductility.

According to the embodiment depicted in FIGS. 12A and 12B, a puck need not be in motion during the transfer of the product sheet from the lamination roll to the puck. The puck may or may not be attached to a conveyor, but in this embodiment the conveyor need not be in motion during the lamination or stack building process. A roller is moved across the puck and simultaneously rotated between positions A and B so that a point on the surface of the roller interfaces with the puck at the same location on each pass. The roll is capable of holding the segmented product sheet in a fixed position on the surface of the roll. This may be accomplished by vacuum, electrostatics, or with an adhesive.

The stacking/lamination apparatus 500 has an adjustable mechanism to control the distance from the surface of the puck to the surface of the lamination roll. As the stack height grows, the distance is increased. The roll may deliver a segmented product sheet or a segmented product sheet supported by a liner sheet to the puck. The apparatus 500 is designed to laminate two dissimilar laminates or laminate composites into a single stack with precision alignment. Pallets of each laminate could be attached to either end of the machine for laminate pick up prior to lamination.

The stacking/lamination apparatus 500, according to one embodiment, employs a vacuum roll 502 to position and hold the materials. Positioning of the materials is accomplished by using reference marks on the vacuum roll 502. After the patch of material is placed on the vacuum roll 502 using the roll reference marks for its accurate placement, the vacuum roll 502 is advanced by rotating it with a handle 504. As the vacuum roll 502 rotates, it advances on a mechanism 506 for position matching.

Due to this interaction, the patch of material carried by the vacuum roll 502 is always presented to the same location on the lamination puck 508, at which location lamination occurs. Because the patch material adheres to the lamination puck 508 or subsequent layers of material with greater force than the holding force of the vacuum roll 502, the patch of material releases from the vacuum roll 502 and is transferred to the lamination puck 508. The second layer of the material is then placed on the vacuum roll 502 in accordance to another set of reference marks on the vacuum roll 502, such reference marks being dependant on the applicable lamination requirements for a given process, and is laminated to the growing stack of materials in the reverse direction. As the stack grows, a screw jack 510 is actuated via handle 513 to lower the height of the laminate stack for clearance and to maintain a consistent laminating pressure.

By way of further description, stacking/lamination apparatus 500 includes a station 501 having a station lamination opening 503 and an adjustable table 505. The adjustable table 505, which has a top surface 507, may be adjustable in terms of vertical (e.g., height), lateral, and axial axes (e.g., x, y, and z axes), and, in addition, may be adjustable in terms of yaw. The adjustable table 505 may be situated within and integral with the station 501 and located below the station lamination opening 503 of the station 501. The apparatus further includes a puck 508 attached to the adjustable table top surface 507. The puck 508 is movable as a function of adjustable table top surface movement. A rotatable lamination surface 502 is provided for movement between positions A and B, and includes an apparatus 506 for position matching the puck 508 to the rotatable lamination surface 502.

A first product delivery apparatus, according to this embodiment, feeds first product sheets, such as cathode layered structures, to the rotatable lamination surface 502. A second product delivery apparatus feeds second product sheets, such as anode layered structures, to the rotatable lamination surface 502. The first and second product delivery apparatuses cooperate with the rotatable lamination surface 502 to transfer respective first and second sheets to the puck 508 on a repetitive and alternating basis from opposing ends of the station 501 to produce a stack of alternating first and second product sheets on the puck 508.

The sheets may be held to the rotatable lamination surface 502 by use of a vacuum, an adhesive, electrostatics, or a combination of these approaches. Position matching of the puck 508 to the rotatable lamination surface 502, according to one approach, is accomplished through use of a rack and pinion apparatus 506. It will be understood that other position matching or adjusting mechanisms may be employed, such as roller bearings with guide rollers, pick and place apparatuses, or other gear/belt assemblies, for example.

The movement of the rotatable lamination surface 502 and the adjustable table top surface 507 may be effected manually. Alternatively, the movement of the rotatable lamination surface 502 and the adjustable table top surface 507 may be effected in a fully or partially automated manner, such as by use of one or more controllable electric motors.

In one embodiment, all or a portion of the puck 508 is formed from a thermal and electrical insulating material. The puck 508 may be provided with position indicators, such as x, y, and z position indicators and a yaw indicator, for example. The product delivery apparatuses may include one or more webs of single or multiple layered sheets, and the sheets may include release liners. The product delivery apparatuses may include one or more manual sheet feed apparatuses that provide for the manual feeding of sheets to the rotatable lamination surface 502.

It will be understood that a wide variety of materials of differing types, sizes, and shapes may be processed by rotary converting and/or stacking apparatuses and methodologies in accordance with the principles of the present invention. The principles of the present invention may be applied to the construction of laminate fuel cells, for example.

In accordance with one embodiment, electrochemical devices, including proton exchange membrane fuel cells, sensors, electrolyzers, chlor-alkali separation membranes, and the like, can be constructed from membrane electrode assemblies (MEAs). Such MEAs incorporate at least one electrode portion, which includes a catalytic electrode material such as Platinum (Pt) in contact with an ion conductive membrane. Ion conductive membranes (ICMs) are often used in electrochemical cells as solid electrolytes.

In a typical fuel cell, for example, an ICM is in contact with a cathode and an anode, and transports ions that are formed at the anode to the cathode, allowing current to flow in an external circuit connecting the electrodes. The central component of an electrochemical cell, such as a fuel cell, sensor, electrolyzer, or electrochemical reactor, is a 3-layer membrane electrode assembly, or MEA. The MEA includes, in the most general sense, two catalyzed electrodes between which is sandwiched an ion conducting electrolyte, preferably a solid polymer electrolyte. This 3-layer MEA is, in turn, sandwiched between two porous, electrically conducting elements referred to as electrode backing layers (EBLs), to form a 5-layer MEA.

The apparatuses and methods of the present invention can be used, for example, to join a cathode and an anode to an ICM, in registration with each other, and, in a subsequent step, join the 3-layer MEA to respective cathode-side and anode-side EBLs to form a 5-layer MEA. Alternatively, preformed subassemblies of the 5-layer MEA can be brought together to form the completed MEA. For example, a subassembly comprising an EBL to which an electrode layer has been joined can be joined to a subassembly comprising an EBL to which a second electrode, further bearing an ICM, has been joined.

Other types of laminate stacks may be produced in accordance with the principles of the present invention.

FIGS. 13–18 depict several different types of laminate stacks that may be produced using a rotary converting and/or VUDL stacking approach of the present invention.

Figure 13:
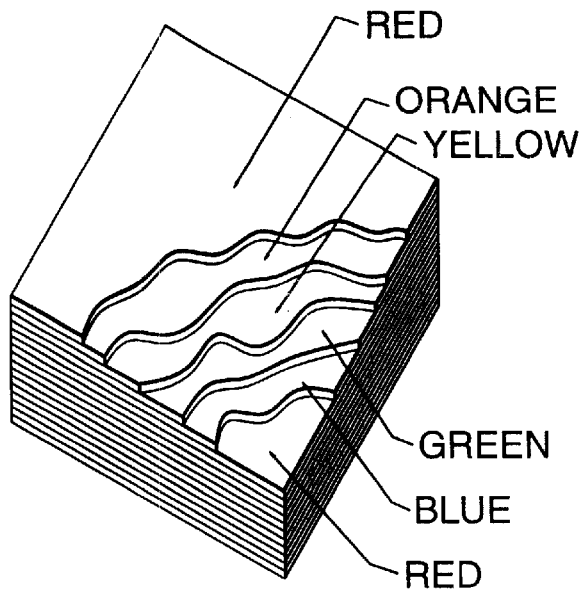
FIG. 13 illustrates a laminate stack of multi-colored sheets of material produced by a rotary converting and/or stacking apparatus according to the principles of the present invention.

FIG. 13 illustrates a laminate stack of multi-colored sheets of material. Multiple layers of colored or printed sheets can be laminated together and cut to a desired shape and then stacked. For example, five different webs of product, each being a distinct color with some portion of the back side containing adhesive, can be laminated together and cut to a desired shape. This stack may be placed onto a puck which recirculates until several laminations are stacked up, at which point each puck is moved out of the recirculating loop and is replaced by an empty puck.

Figure 14:
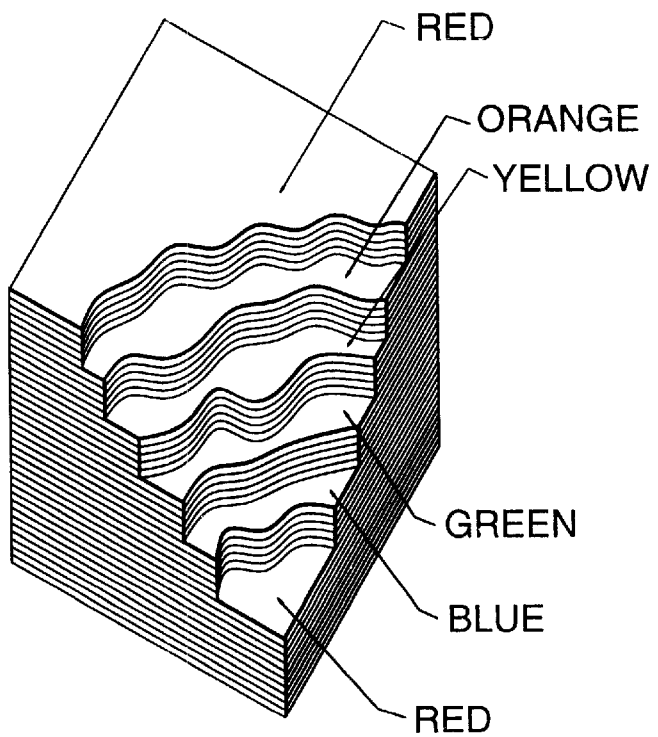
FIG. 14 shows multiple layers of a single colored sheet of paper or film with a portion of the back side having an adhesive which are laminated together and cut into a desired shape by use of a rotary converting and/or stacking apparatus according to the principles of the present invention.

FIG. 14 shows multiple layers of a single colored sheet of paper or film with a portion of the back side having an adhesive which are laminated together and cut into a desired shape at a first cutting station (e.g., rotary die station). The cut stack is placed on a puck. In a second web line, multiple layers of a second color with a portion of the back side having an adhesive are laminated together and cut into a desired shape at a second cutting station. This cut stack is placed on a puck with a stack that was cut at the first cutting station.

This process may continue for a total of five discrete web lines, for example. The pucks move from web line to web line depending on the order the stacks are to be made. Once a pad is completed, each puck is moved from the stacking apparatus and is replaced by an empty puck. The complete puck is moved to a packout section.

Figure 15:
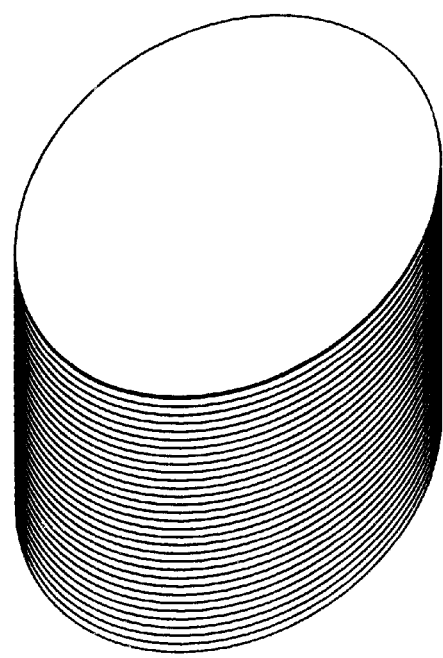
FIG. 15 shows multiple layers of a single colored sheet of paper or film similar to that shown in FIG. 14, but having a shape different from that depicted in FIG. 14.

FIG. 15 illustrates a product stack or pad which is similar to that shown in FIG. 14. The product stack depicted in FIG. 15 is oval in shape, whereas the product stack shown in FIG. 14 has a square or rectangular shape. It is understood that the shape of the product stack shown in FIGS. 14 and 15 may vary as needed or desired.

Figure 16:
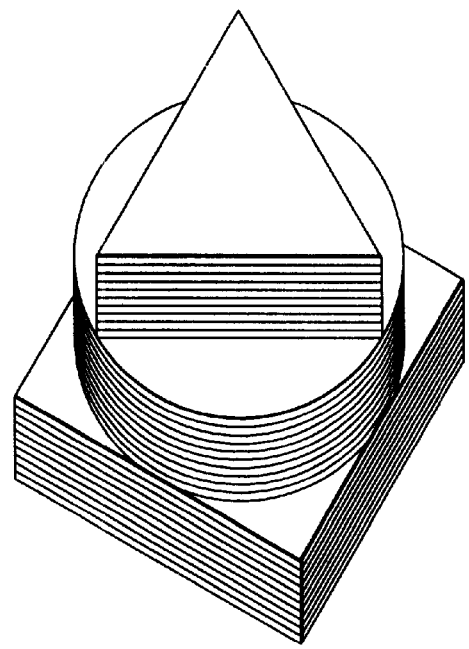
FIG. 16 illustrates a product stack or pad comprising various sheet or film layers of varying shapes and sizes produced by a rotary converting and/or stacking apparatus according to the principles of the present invention.
Figure 17:
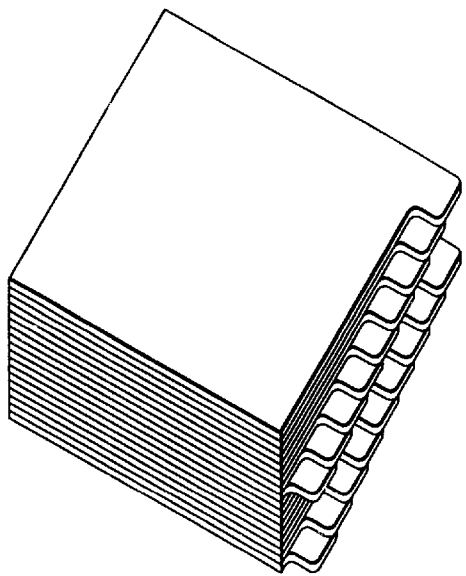
FIG. 17 depicts a product stack comprising various sheet or film layers in which each sheet has a different shape produced by a rotary converting and/or stacking apparatus according to the principles of the present invention.

FIG. 16 illustrates another product stack or pad which is similar to that depicted in FIGS. 14 and 15, but the shapes of various layers change, it being understood that the color of the sheets (e.g., paper or film) may or may not change. FIG. 17 depicts a product stack which is similar to that shown in FIGS. 14 and 15, with the exception that each sheet has a different shape and only one sheet is applied to the puck at a time. There may also be a multitude of shapes where more than five discrete cutting stations may be required.

Figure 18:
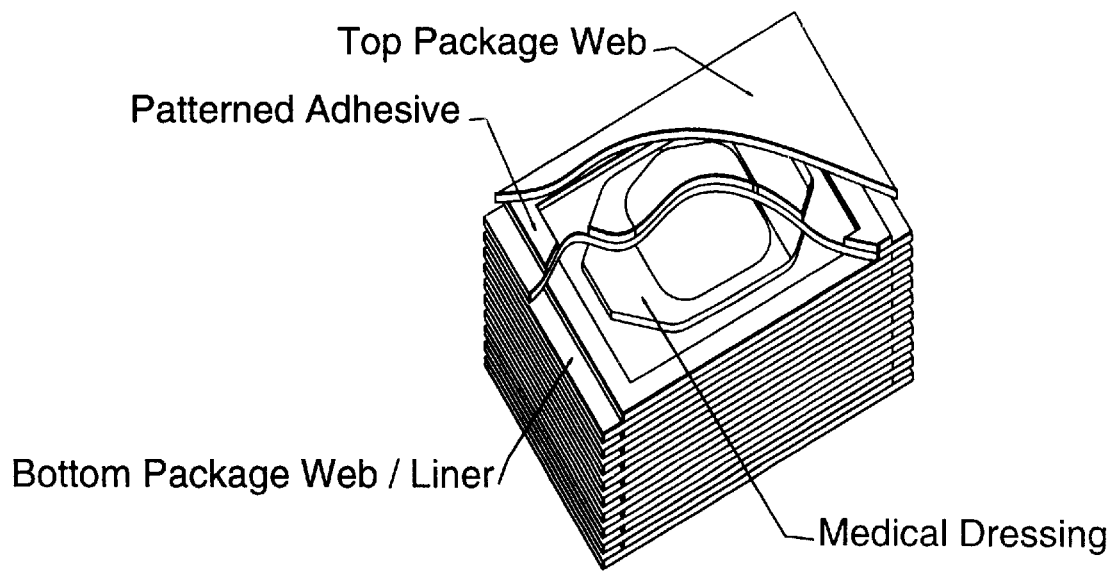
FIG. 18 shows a pack of medical dressings which are produced by a rotary converting and/or stacking apparatus according to the principles of the present invention.

FIG. 18 shows a pack of medical dressings which are stacked in accordance with the principles of the present invention. A bottom web acts as the bottom sheet of a sterile package and also acts as the liner for the product. A patterned adhesive is coated on the package web on the non-liner side. The medical dressing is converted upstream from this process and each dressing is cut and placed onto the liner/packaging web. This packaging web is cut and placed onto a puck which recirculates back, and another dressing on the packaging web is cut and placed on top of the stack. This may be repeated between 10 and 50 times, for example.

Once all the dressings are placed on the puck, a top packaging web is applied to the top of the stack to serve as the top film of the dressing on the top of the stack. For use of the product, the top web is removed, thereby exposing the dressing. Once the dressing is removed, the bottom packaging web/product liner for the previous dressing now becomes the top packaging web for the next product.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A product stacking apparatus, comprising:
   one or more stations each including a conveyor upon which spaced-apart pucks are coupled for travel thereon; and
   a product delivery apparatus that drives one or more movable webs to which segmented product sheets are removably affixed, the product delivery apparatus comprising one or more rotatable lamination interfaces associated with each of the stations for transferring product sheets from the webs to the pucks on a repetitive basis to produce a stack of product sheets on the respective pucks.

2. The apparatus of claim 1, wherein the movable webs each comprise a release liner to which the segmented product sheets are removably affixed.

3. The apparatus of claim 1, wherein the product delivery apparatus comprises a feed apparatus and a wind apparatus associated with each web, the product sheets traveling through a nip respectively formed between one or more of the rotatable lamination interfaces and the respective pucks.

4. The apparatus of claim 1, wherein the product delivery apparatus comprises position adjustment mechanisms coupled to each rotatable lamination interface and a sensor that senses a change in height of the stack of product sheets developed on the pucks, the position adjustment mechanism adjusting a position of each rotatable lamination interface in response to the sensor sensing a change in height of the stack of product sheets.

5. The apparatus of claim 1, wherein the pucks are coupled to the one or more conveyors for continuous loop travel thereupon.

6. The apparatus of claim 1, wherein the pucks are coupled to the one or more conveyors for reciprocating travel thereupon.

7. The apparatus of claim 1, further comprising a control system including sensors that sense a parameter of puck movement, the control system adjusting one or both of conveyor movement and/or web movement to maintain a desired registration of the product sheets on the pucks.

8. The apparatus of claim 1, further comprising a control system including sensors that sense a parameter of web movement, the control system adjusting one or both of conveyor movement and/or web movement to maintain a desired registration of the product sheets on the pucks.

9. The apparatus of claim 1, wherein each of the segmented product sheets defines all or a portion of an electrochemical cell, including cells used in solid-state thin-film batteries and fuel cells.

10. The apparatus of claim 1, wherein each of the segmented product sheets defines all or a portion of a pad comprising layers of film or sheet material, a portion of each of the layers provided with an adhesive.

11. The apparatus of claim 1, wherein each of the segmented product sheets defines all or a portion of a pack comprising layers of medical dressing.

12. The apparatus of claim 1, further comprising an unload station for detaching the stacks of product sheets from the pucks.

13. The apparatus of claim 1, wherein a rotatable lamination interface of the product delivery apparatus comprises a vacuum roll.

14. A product stacking apparatus, comprising:
   a first station including a first conveyor upon which spaced-apart first pucks are coupled for travel thereon;
   a second station including a second conveyor upon which spaced-apart second pucks are coupled for travel thereon; and
   a product delivery apparatus that drives a movable web to which segmented product sheets are removably affixed, the product delivery apparatus transferring alternating product sheets to the respective first and second pucks of the first and second stations on a repetitive basis so as to produce a stack of product sheets on the respective first and second pucks.

15. The apparatus of claim 14, wherein the movable web comprises a release liner to which the segmented product sheets are removably affixed.

16. The apparatus of claim 14, wherein the product delivery apparatus comprises a feed apparatus, a wind apparatus, a first application roller, and a second application roller, the alternating product sheets traveling through nips respectively formed between the first and second application rollers and the first and second pucks in response to feed and wind apparatus movement of the web.

17. The apparatus of claim 16, wherein the product delivery apparatus comprises a position adjustment mechanism coupled to the first and second application rollers and a sensor that senses a change in height of the stack of product sheets, the position adjustment mechanism adjusting a position of the first and second application rollers in response to the sensor sensing a change in height of the stack of product sheets.

18. The apparatus of claim 14, wherein the first and second pucks are coupled to the respective first and second conveyors for continuous loop travel thereupon.

19. The apparatus of claim 14, wherein the first and second pucks are coupled to the respective first and second conveyors for reciprocating travel thereupon.

20. The apparatus of claim 14, further comprising a control system including sensors that sense a parameter of first and second puck movement, respectively, the control system adjusting first and second conveyor movement and/or web movement to maintain a desired registration of the product sheets on the respective first and second pucks.

21. The apparatus of claim 14, further comprising a control system including sensors that sense a parameter of web movement, the control system adjusting one or more of first or second conveyor movement and/or web movement to maintain a desired registration of the product sheets on the pucks.

22. The apparatus of claim 14, wherein each of the segmented product sheets defines all or a portion of an electrochemical cell or a fuel cell.

23. The apparatus of claim 14, wherein each of the segmented product sheets defines all or a portion of a pad comprising layers of film or sheet material, a portion of each of the layers provided with an adhesive.

24. The apparatus of claim 14, wherein each of the segmented product sheets defines all or a portion of a pack comprising layers of medical dressing.

25. The apparatus of claim 14, further comprising an unload station for detaching the stacks of product sheets from the first and second pucks.

26. A product stacking apparatus, comprising:
   a station including a conveyor upon which spaced-apart pucks are coupled for travel thereon;
   a first product delivery apparatus that drives a movable first web to which segmented first product sheets are removably affixed, the first product delivery apparatus transferring first product sheets to each of the pucks; and a second product delivery apparatus that drives a movable second web to which segmented second product sheets are removably affixed, the second product delivery apparatus transferring second product sheets to each of the pucks; the first and second product delivery apparatuses transferring respective first and second sheets to each of the pucks on a repetitive basis to produce a stack of alternating first and second product sheets on each of the pucks.

27. The apparatus of claim 26, wherein each of the movable first and second webs comprises a release liner to which the respective first and second segmented product sheets are removably affixed.

28. The apparatus of claim 26, wherein each of the first and second product delivery apparatuses comprises a feed apparatus, a wind apparatus, a first application roller, and a second application roller, the first and second product sheets traveling through nips respectively formed between the first and second application rollers and the pucks in response to feed and wind apparatus movement of the first and second webs.

29. The apparatus of claim 28, wherein each of the first and second product delivery apparatuses comprises:
    position adjustment mechanisms coupled to respective first and second application rollers, and;
    a sensor that senses a change in height of the stack of product sheets, the position adjustment mechanisms adjusting a position of the respective first and second application rollers in response to the sensor sensing a change in height of the stack of product sheets.

30. The apparatus of claim 26, wherein the pucks are coupled to the conveyor for continuous loop or reciprocating travel thereupon.

31. The apparatus of claim 26, further comprising a control system including sensors that sense a parameter of puck movement, the control system adjusting conveyor movement to maintain a desired registration of the product sheets on the pucks.

32. The apparatus of claim 26, further comprising a control system that independently adjusts first and second product delivery apparatus movement to maintain the desired registration of the product sheets on the pucks.

33. The apparatus of claim 26, wherein each of the segmented product sheets defines all or a portion of an electrochemical cell.

34. The apparatus of claim 26, wherein each of the segmented product sheets defines all or a portion of a pad comprising layers of film or sheet material, a portion of each of the layers provided with an adhesive.

35. The apparatus of claim 26, wherein each of the segmented product sheets defines all or a portion of a pack comprising layers of medical dressing.

36. The apparatus of claim 26, further comprising an unload station for detaching the stacks of product sheets from the pucks.

37. The apparatus of claim 26, wherein each of the first and second product delivery apparatuses comprises a vacuum roll for transferring respective first and second sheets to each of the pucks.

38. A method of stacking sheets of material on a plurality of pucks, comprising:
    moving a plurality of spaced-apart pucks on a recirculating path;
    moving one or more webs, each comprising a release liner to which segmented product sheets are removably affixed, into proximity with the pucks on a successive basis;
    forming a nip between one or more of the moving webs and the pucks and
    rotatably transferring product sheets from one or more of the webs to the pucks at the nip on a repetitive basis to produce a stack of product sheets on the respective pucks.

39. The method of claim 38, further comprising sensing a height of the stack of product sheets on the pucks.

40. The method of claim 39, further comprising adjusting a position of the nip as a function of the height of the stack of product sheets on the pucks.

41. The method of claim 38, wherein moving the pucks comprises moving the pucks for continuous loop travel along the recirculating path.

42. The method of claim 38, wherein moving the pucks comprises moving the pucks for continuous reciprocating travel along the recirculating path.

43. The method of claim 38, further comprising sensing a parameter of web movement and adjusting one or both of puck movement and/or web movement to maintain a desired registration of the product sheets on the pucks.

44. The method of claim 38, further comprising sensing a parameter of puck movement and adjusting one or both of puck movement and/or web movement to maintain a desired registration of the product sheets on the pucks.

45. The method of claim 38, wherein each of the segmented product sheets defines all or a portion of an electrochemical cell.

46. The method of claim 38, wherein each of the segmented product sheets defines all or a portion of a pad comprising layers of film or sheet material, a portion of each of the layers provided with an adhesive.

47. The method of claim 38, wherein each of the segmented product sheets defines all or a portion of a pack comprising layers of medical dressing.

48. The method of claim 38, further comprising detaching the stacks of product sheets from the pucks.

49. A method of stacking sheets of material on a plurality of pucks, comprising:
    moving a plurality of spaced-apart pucks on a recirculating path;
    moving a web comprising a release liner to which segmented product sheets are removably affixed;
    transferring, using a vacuum lamination roll, the segmented product sheets from the release liner into a nip defined between the vacuum lamination roll and the pucks; and
    transferring product sheets from the vacuum lamination roll to the pucks at the nip on a repetitive basis to produce a stack of product sheets on the respective pucks.

50. The method of claim 49, further comprising sensing a height of the stack of product sheets on the pucks.

51. The method of claim 50, further comprising adjusting a position of the nip as a function of the height of the stack of product sheets on the pucks.

52. The method of claim 49, wherein moving the pucks comprises moving the pucks for continuous loop travel along the recirculating path.

53. The method of claim 49, wherein moving the pucks comprises moving the pucks for continuous reciprocating travel along the recirculating path.

54. The method of claim 49, further comprising sensing a parameter of web movement and adjusting one or both of puck movement, vacuum lamination roll movement, and/or web movement to maintain a desired registration of the product sheets on the pucks.

55. The method of claim 49, further comprising sensing a parameter of puck movement and adjusting one or both of puck movement, vacuum lamination roll movement, and/or web movement to maintain a desired registration of the product sheets on the pucks.

56. The method of claim 49, further comprising sensing a parameter of vacuum lamination roll movement and adjusting one or both of puck movement, vacuum lamination roll movement, and/or web movement to maintain a desired registration of the product sheets on the pucks.

57. The method of claim 49, wherein each of the segmented product sheets defines all or a portion of an electrochemical cell.

58. The method of claim 49, wherein each of the segmented product sheets defines all or a portion of a pad comprising layers of film or sheet material, a portion of each of the layers provided with an adhesive.

59. The method of claim 49, wherein each of the segmented product sheets defines all or a portion of a pack comprising layers of medical dressing.

60. The method of claim 49, further comprising detaching the stacks of product sheets from the pucks.

61. A product stacking apparatus, comprising:
   a station comprising an adjustable table;
   a puck coupled to the adjustable table;
   a rotatable lamination surface;
   a position adjustment apparatus that adjusts the relative position between the puck and the lamination surface; and
   one or more product delivery apparatuses, each product delivery apparatus delivering one or more product layered structures to the lamination surface, the lamination surface rotatably transferring the product layered structures to the puck on a repetitive and alternating basis to produce a stack of alternating product layered structures on the puck.

62. The apparatus of claim 61, wherein the rotatable lamination surface comprises a vacuum system, the vacuum system providing a vacuum to releasably hold the product layered structures to the rotatable lamination surface.

63. The apparatus of claim 61, wherein the rotatable lamination surface comprises an adhesive, the adhesive releasably holding the layered structures to the rotatable lamination surface.

64. The apparatus of claim 61, wherein the rotatable lamination surface holds the layered structures to the rotatable lamination surface via an electrostatic field.

65. The apparatus of claim 61, wherein the rotatable lamination surface and the adjustable table are manually adjustable.

66. The apparatus of claim 61, wherein the rotatable lamination surface and the adjustable table are fully or partially automatically adjustable.

67. The apparatus of claim 61, wherein the position adjustment apparatus comprises a rack and pinion apparatus.

68. The apparatus of claim 61, wherein all or a portion of the puck comprises a thermal and electrical insulating material.

69. The apparatus of claim 61, wherein the puck comprises multiple-axis position indicators.

70. The apparatus of claim 61, wherein the puck comprises a yaw indicator.

71. The apparatus of claim 61, wherein the one or more product delivery apparatuses respectively comprise a web of single or multiple layered structures.

72. The apparatus of claim 71, wherein the layered structures comprise release liners.

73. The apparatus of claim 61, wherein the one or more product delivery apparatuses respectively comprise a manual sheet feed apparatus.

74. The apparatus of claim 61, wherein the one or more product delivery apparatuses respectively comprise a partially or fully automatic sheet feed apparatus.

* * * * *

UNITED STATES PATENT AND TRADEMARK OFFICE
CERTIFICATE OF CORRECTION

PATENT NO. : 6,547,229 B1  
DATED : April 15, 2003  
INVENTOR(S) : Hanson, Eric J.

It is certified that error appears in the above-identified patent and that said Letters Patent is hereby corrected as shown below:

Column 22,
Line 3, delete "VUDL" and insert in place thereof -- VL/DL --

Signed and Sealed this

Twenty-fourth Day of February, 2004

JON W. DUDAS
*Acting Director of the United States Patent and Trademark Office*